US006364328B1

(12) United States Patent
Stahler, Sr.

(10) Patent No.: US 6,364,328 B1
(45) Date of Patent: Apr. 2, 2002

(54) THREE-POSITION HAND TRUCK USING MULTIPLE LOCKING MECHANISMS AND/ OR A COMBINATION CONNECTING MEMBER AND CHANNEL

(75) Inventor: Richard D. Stahler, Sr., Mantua, NJ (US)

(73) Assignee: Wesco Industrial Products, Inc., Lansdale, PA (US)

( * ) Notice: Subject to any disclaimer, the term of this patent is extended or adjusted under 35 U.S.C. 154(b) by 0 days.

(21) Appl. No.: 09/649,933

(22) Filed: Aug. 29, 2000

(51) Int. Cl.$^7$ .................................................. B62B 1/00
(52) U.S. Cl. ................ 280/47.18; 280/47.2; 280/47.27; 280/651
(58) Field of Search .......................... 280/47.26, 47.27, 280/30, 651, 652, 643, 654, 655, 655.1, 43.1, 659, 47.131, 47.2, 47.24, 47.28, 47.35, 47.34, 79.11, 79.3, 47.18; D3/12, 26; 108/11, 15, 18; 187/231; 182/20

(56) References Cited

U.S. PATENT DOCUMENTS

| | | | | | |
|---|---|---|---|---|---|
| 627,284 | A | * | 6/1899 | Walker ..................... | 280/47.27 |
| 2,598,168 | A | * | 5/1952 | Hooz et al. .............. | 280/47.27 |
| 2,605,117 | A | * | 7/1952 | Hooz et al. .............. | 280/47.27 |
| 2,606,770 | A | * | 8/1952 | Reichert .................... | 280/47.2 |
| 3,064,989 | A | * | 11/1962 | Bellows .................... | 280/47.18 |
| 3,785,669 | A | * | 1/1974 | Doheny .................... | 280/47.18 |
| 3,850,441 | A | * | 11/1974 | Peters et al. ......... | 280/47.27 X |
| 3,873,118 | A | * | 3/1975 | Takagi ................. | 280/47.27 X |
| 4,009,891 | A | * | 3/1977 | Jensen ..................... | 280/47.27 |
| 4,284,286 | A | * | 8/1981 | Lewallen ............... | 280/47.2 X |
| 5,160,153 | A | * | 11/1992 | Zan ........................... | 280/47.2 |
| 5,244,221 | A | * | 9/1993 | Ward ...................... | 280/47.2 X |
| 5,277,439 | A | * | 1/1994 | Pipes et al. ................ | 280/47.2 |
| 5,810,373 | A | * | 9/1998 | Miranda .................... | 280/47.2 |
| 6,273,438 | B1 | * | 8/2001 | Prapavat ................ | 280/47.2 X |

OTHER PUBLICATIONS

Internet web site www.magliner.com—printout from web site titled "Three Position Hand Truck" and associated fax from compnay showing three position hand cart first sold Mar. 1997.*
Magliner®, Catalog Advertisement: "Magliner® Hand Truck Accessories", p. 14.
Magliner®, Catalog Advertisement: "Magliner® Bottled Water Trucks", p. 19.
Wesco Manufacturing Company; "Master Catalog, 2$^{nd}$ Edition;" pp.: front cover, 21, rear cover; published 1994.
Fred Hill and Son Co,; 1993 Catalog; pp.: front cover, 86, 87, 92, rear cover; published 1993.
Harper; Catalog No. 190; pp.: front cover, 13, 14, 31, rear cover; published 1990.
Dutro Company; Catalog No. 401–2; pp.: front cover, 6, 9, 10, rear cover; undated (admitted prior art).

* cited by examiner

*Primary Examiner*—Brian L. Johnson
*Assistant Examiner*—Bryan Fischmann
(74) *Attorney, Agent, or Firm*—Akin, Gump, Strauss, Hauer & Feld, L.L.P.

(57) ABSTRACT

A hand truck convertible into either one of a cart and an inclined cart includes a primary frame having a first pair of wheels rotatably mounted thereon. A secondary frame is pivotally attached to the primary frame and has at least one additional wheel rotatably mounted thereon. A connecting member is attached to the secondary frame. A first locking mechanism is attached to the primary frame and detachably secures the secondary frame to the primary frame while the secondary frame is in the hand-truck-position and while the secondary frame is in the inclined-cart-position. A second locking mechanism is attached to the primary frame and detachably secures the connecting member to the primary frame while the secondary frame is in the inclined-cart-position. Alternatively, a channel is formed in the primary frame and the connecting member is slidably engaged with the channel.

11 Claims, 19 Drawing Sheets

*Fig. 26* *Fig. 27*
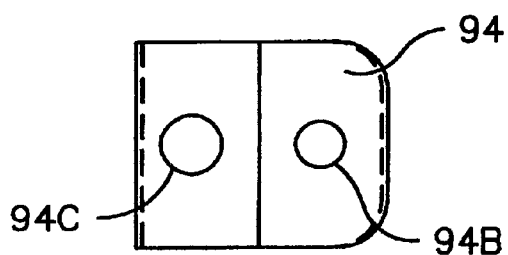
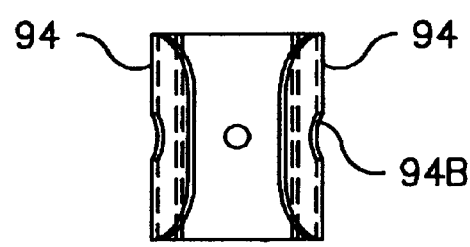
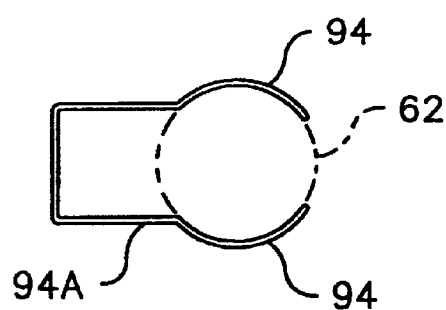
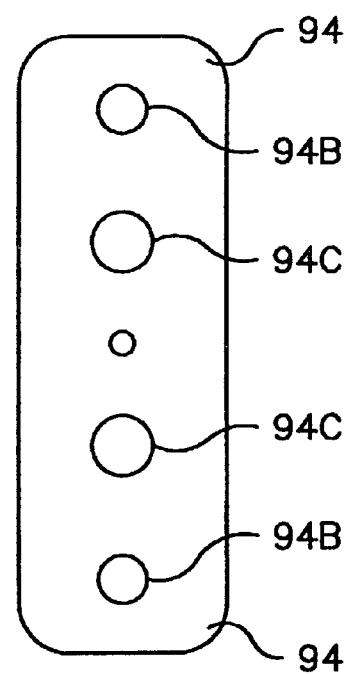
*Fig. 25*
*Fig. 28*

THREE-POSITION HAND TRUCK USING MULTIPLE LOCKING MECHANISMS AND/ OR A COMBINATION CONNECTING MEMBER AND CHANNEL

BACKGROUND OF THE INVENTION

The present invention relates to a hand truck and, more specifically, to a hand truck that is convertible into either one of a cart and an inclined cart.

Many devices have been developed over the years to aid people in the movement and transportation of items that otherwise would be too heavy or unwieldy to move. There exists a multitude of powered devices such as cranes, forklifts, hydraulic ramps, etc. that simplify moving. A similar variety of non-powered devices also exist for people to choose from. Non-powered devices, such as pulleys, ropes, clamps, levers and hand trucks, are commonly available to consumers. The ease of use of contemporary hand trucks makes the hand truck an ideal tool for transporting heavy objects and has led to the common use of hand trucks by tremendous numbers of people.

The wide utilization of hand trucks has caused many manufacturers to research improvements in the design of the modem hand truck. Today, industrial quality hand trucks are produced that have frames made of sturdier, tougher materials to simplify transporting appliances and other items that are too large for smaller sized hand trucks. Additionally, hand trucks have been developed that are convertible into a cart or into an inclined cart to simplify the carrying of some objects.

One disadvantage of contemporary hand trucks which are convertible into a cart or into an inclined cart, is the lack of a stable locking structure to secure the hand truck in the desired position. This deficiency can result in the hand truck becoming dislodged from the desired position when the hand truck impacts a bump or other object. Additionally, some hand trucks that are convertible into different configurations use parts or members that are substantially detached depending on the position into which the hand truck is being configured. This increases the difficulty of adjusting the position of a hand truck and requires operators to physically attach part(s) of the hand truck to change the configuration of the hand truck.

The present invention overcomes many of the drawbacks of the contemporary art by providing a hand truck that is convertible into an inclined cart, that is convertible into a cart, that preferably uses dual locking mechanisms to secure the hand truck in a desired configuration, that preferably uses a channel to avoid having members substantially detached from the hand truck to configure the and truck in a desired position, and that smoothly transitions between various possible configurations.

SUMMARY OF THE INVENTION

Briefly stated, in one embodiment, the present invention is directed to a hand truck convertible into either one of a cart and an inclined cart including a primary frame having a first pair of wheels rotatably mounted thereon. A secondary frame is pivotally attached to the primary frame and has at least one additional wheel rotatably mounted thereon. The secondary frame is moveable into a position selected from any one of the group consisting of a hand-truck-position, generally parallel to the primary frame, a cart-position, generally perpendicular to the primary frame, and an inclined-cart-position, generally positioned at a predetermined angle with respect to the primary frame. The secondary frame, while in either one of the inclined-cart-position and the cart-position, causing the at least one additional wheel, in combination with the first pair of wheels, to be capable of supporting the primary frame. A connecting member is attached to the secondary frame. A first locking mechanism is attached to the primary frame and detachably secures the secondary frame to the primary frame while the secondary frame is in the hand-truck-position and while the secondary frame is in the inclined-cart-position. A second locking mechanism is attached to the primary frame and detachably secures the connecting member to the primary frame while the secondary frame is in the inclined-cart-position.

The present invention is alternatively directed to a hand truck convertible into either one of a cart and an inclined cart including a primary frame having a first pair of wheels rotatably mounted thereon. A secondary frame is pivotally attached to the primary frame and has at least one additional wheel rotatably mounted thereon. The secondary frame is moveable into a position selected from any one of the group consisting of a hand-truck-position, generally parallel to the frame, a cart-position, generally perpendicular to the primary frame, and an inclined-cart-position, generally positioned at a predetermined angle with respect to the primary frame. The secondary frame, while in either one of the inclined-cart-position and the cart-position, causing the at least one additional wheel, in combination with the first pair of wheels, to be capable of supporting the primary frame. A channel is formed in the primary frame. A connecting member is attached to the secondary frame and is slideably engaged with the channel.

BRIEF DESCRIPTION OF THE DRAWINGS

The foregoing summary, as well as the following detailed description of the preferred embodiment of the invention will be better understood when read in conjunction with the appended drawings. For the purpose of illustrating the invention, there is shown in the drawings, an embodiment which is presently preferred. It should be understood, however, that the present invention is not limited to the particular arrangement and instrumentality shown. In the drawings:

FIG. 25 is an enlarged top planar view of a handle securing clasp of the handle of FIG. 23;

FIG. 26 is a left side elevational view of the handle securing clasp of FIG. 23;

FIG. 27 is a front elevational view of the handle securing clasp of FIG. 25; and, FIG. 28 is a top planar view of the blank used to form the handle securing clasp of FIG. 23 prior to the shaping of the clasp.

DETAILED DESCRIPTION OF THE INVENTION

Figure 1:
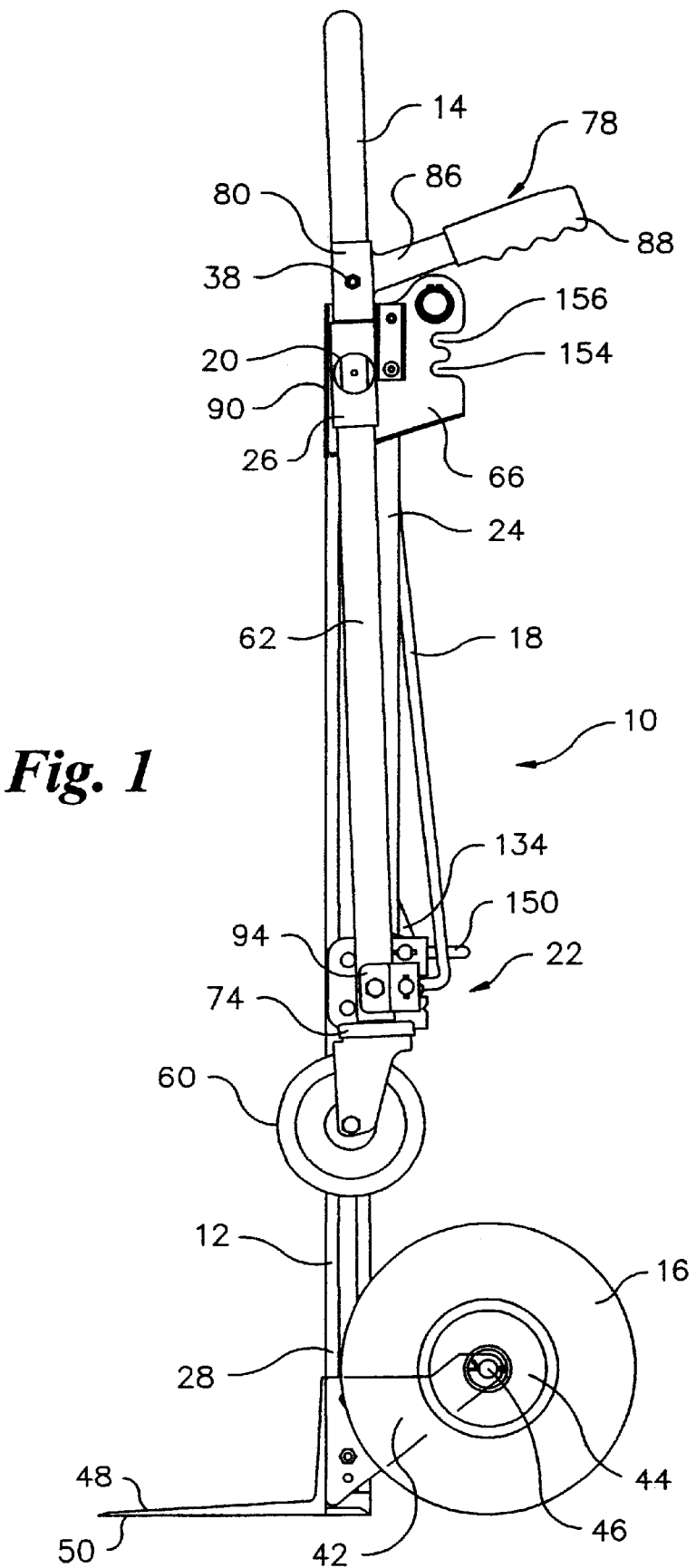
FIG. 1 is a left side elevational view of a hand truck in accordance with the preferred embodiment of the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the hand truck and designated parts thereof. The terminology includes the words above specifically mentioned, derivatives thereof and words of similar import. Additionally, the word "a," as used in the claims and the corresponding portions of the specification, means "at least one."

Referring to the drawings in detail, wherein like numerals indicate like elements throughout, there is shown in FIGS. 1–28 a preferred embodiment of a hand truck, generally designated 10 in accordance with a preferred embodiment of the invention. Generally speaking, the hand truck 10 is convertible into either one of a cart (shown in FIG. 5) and an inclined cart (shown in FIGS. 2 and 3).

Figure 2:
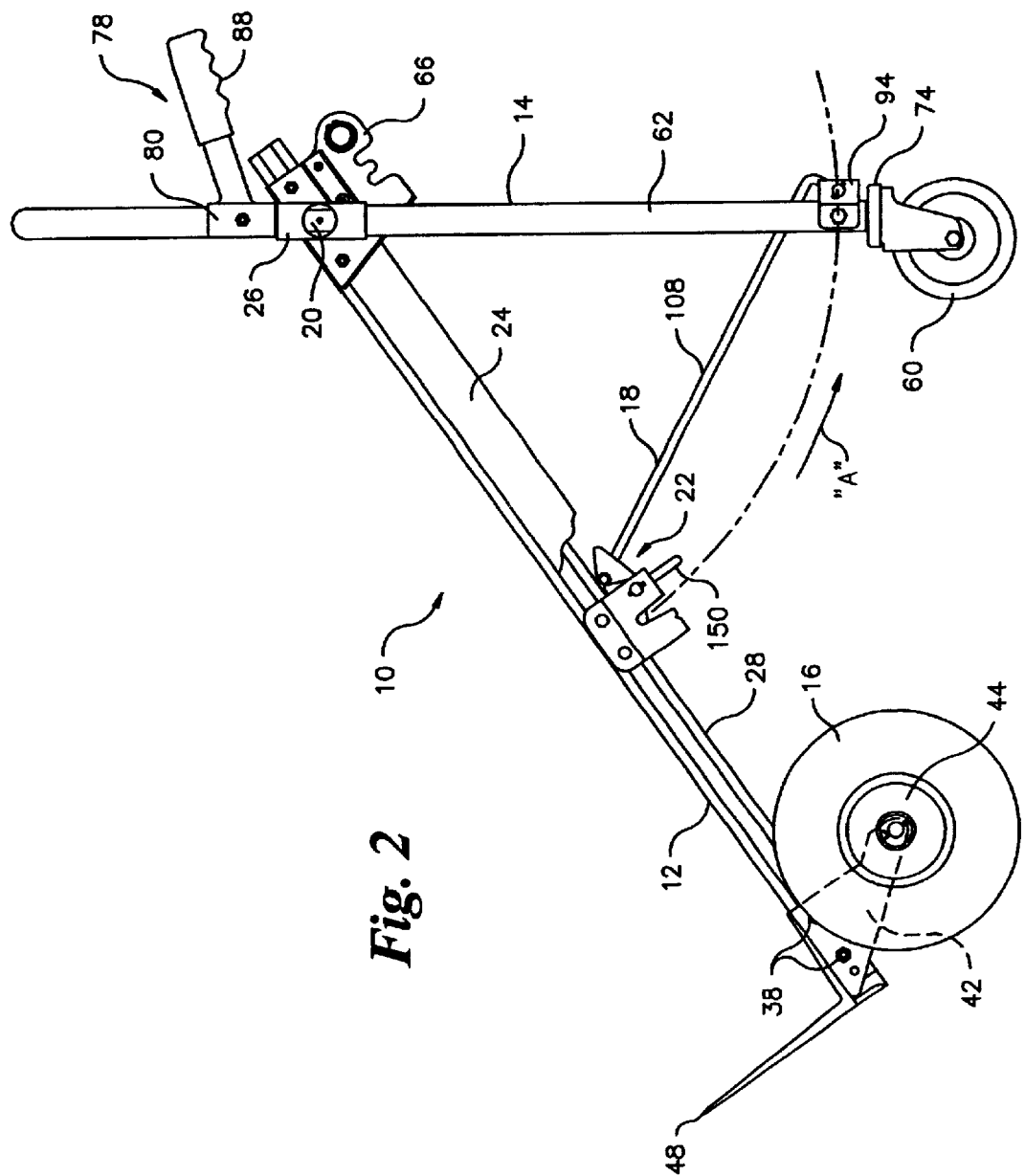
FIG. 2 is a left side elevational view of the hand truck of FIG. 1 in an inclined-cart-position.
Figure 3:
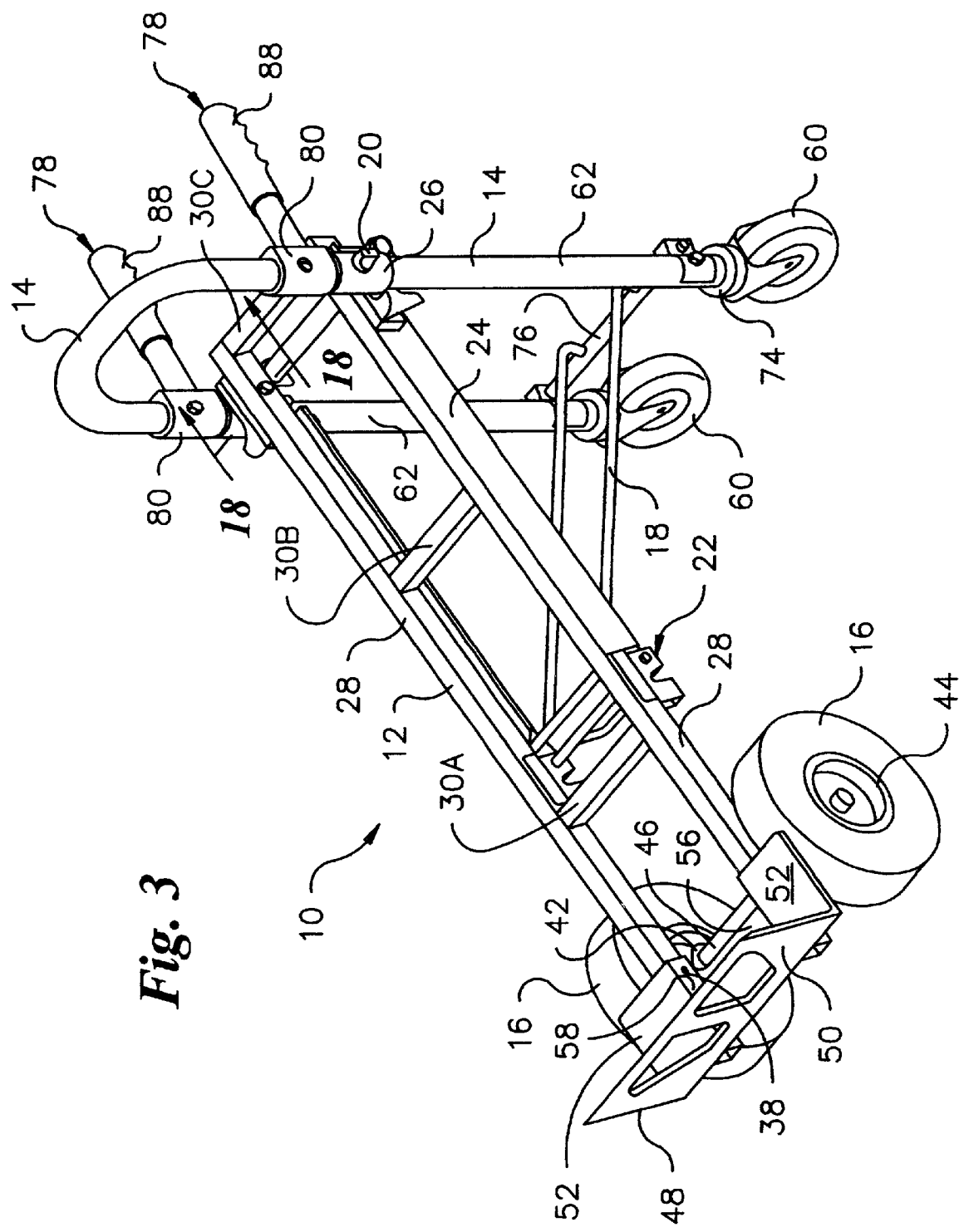
FIG. 3 is a perspective view of the hand truck of FIG. 1 in the inclined-cart-position.
Figure 6:
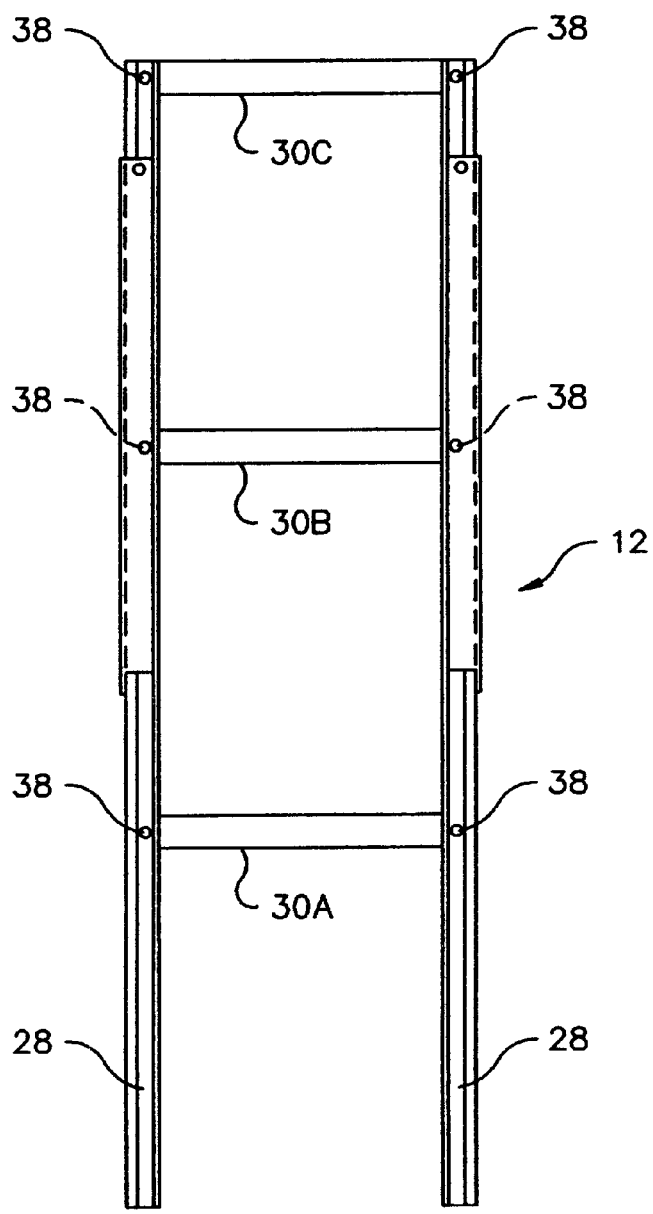
FIG. 6 is a rear elevational view of a primary frame of the hand truck of FIG. 1.
Figure 6A:
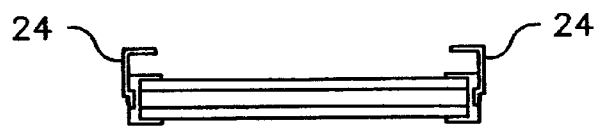
FIG. 6a is a bottom planar view of the primary frame of FIG. 6.

Referring to FIGS. 1–3, the hand truck 10 includes a primary frame 12 which has a first pair of wheels 16 rotatably mounted thereon. The wheels 16 (further described below) are generally located proximate to the lower end of the primary frame 12. The preferred embodiment of the present invention is preferably formed with the primary frame 12 having two vertical struts 28. As best shown in FIG. 6, it is preferable but not necessary, that the two vertical struts 28 are joined by a first, second and third crossbar 30A–30C. The first and second crossbars 30A, 30B extend generally perpendicularly between the vertical struts 28 and divide the length of the primary frame 12 into generally even thirds. The third crossbar 30C is preferably positioned proximate to the upper ends of vertical struts 28 of the primary frame 12.

In the preferred embodiment, the first, second and third crossbars 30A–30C are preferably formed using rectangular tubes of material. The first, second and third crossbars 30A–30C can also be formed using round tubing, polygonal tubing or simple plates or strips of material. While in the preferred embodiment there are three crossbars 30A–30C between the vertical struts 28, it is understood by those of ordinary skill in the art from this disclosure that the present invention is not limited to any particular number of crossbars. For instance, one, two, four or more spaced crossbars can be used to connect the two vertical struts 28 without departing from the scope of the present invention.

Unless otherwise stated herein, the non-fastening elements of the primary frame 12 and a secondary frame 14 (further detailed below) are constructed of a high strength, lightweight material such as aluminum or the like. However, it is understood by those of ordinary skill in the art from this disclosure that other materials, such as steel, stainless steel, or high-density plastic, can be used without departing from the spirit and the scope of the present invention.

Figure 10:
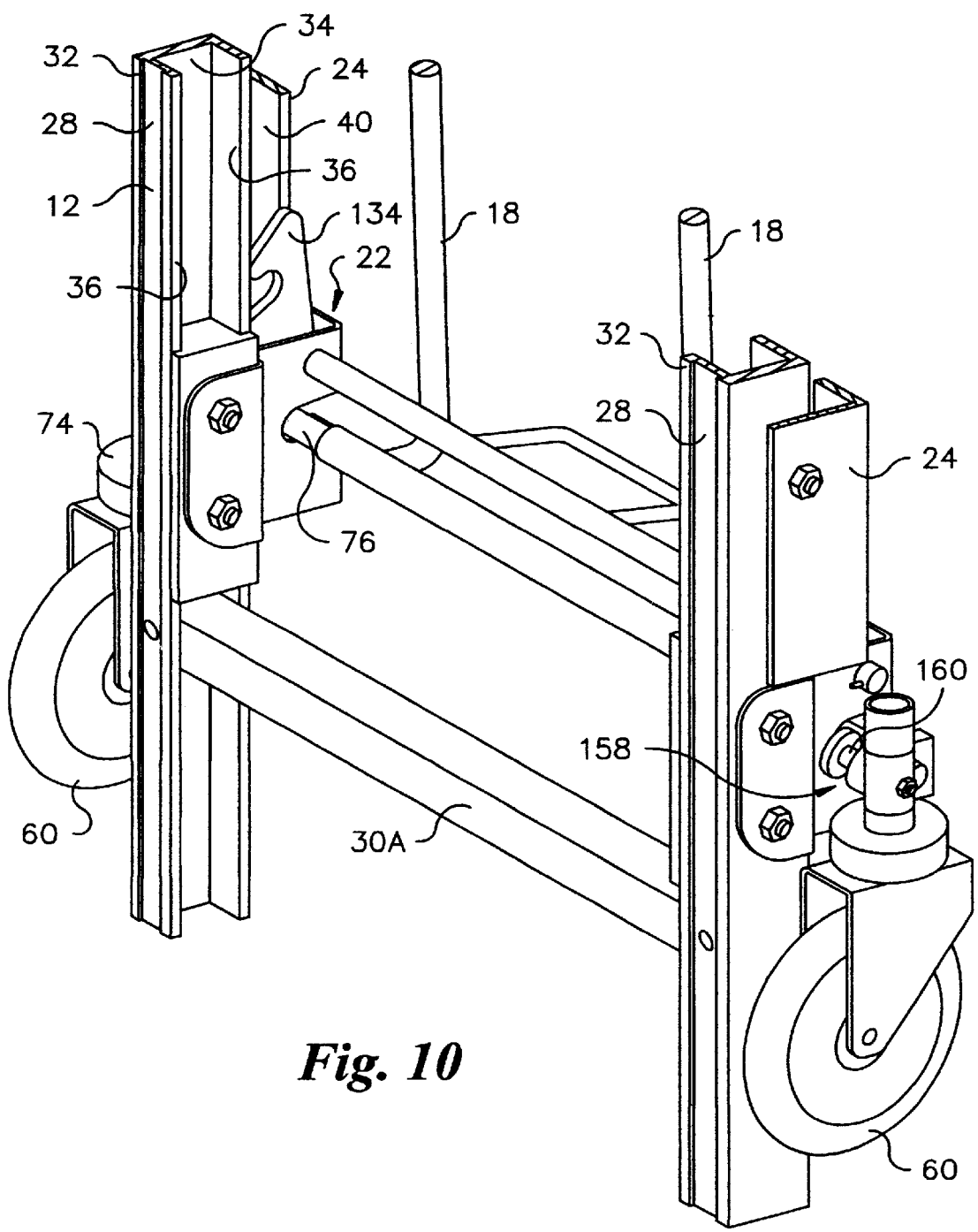
FIG. 10 is an enlarged perspective partial view of the hand truck of FIG. 1 illustrating a crossbar of the secondary frame secured by the second locking mechanism.
Figure 11:
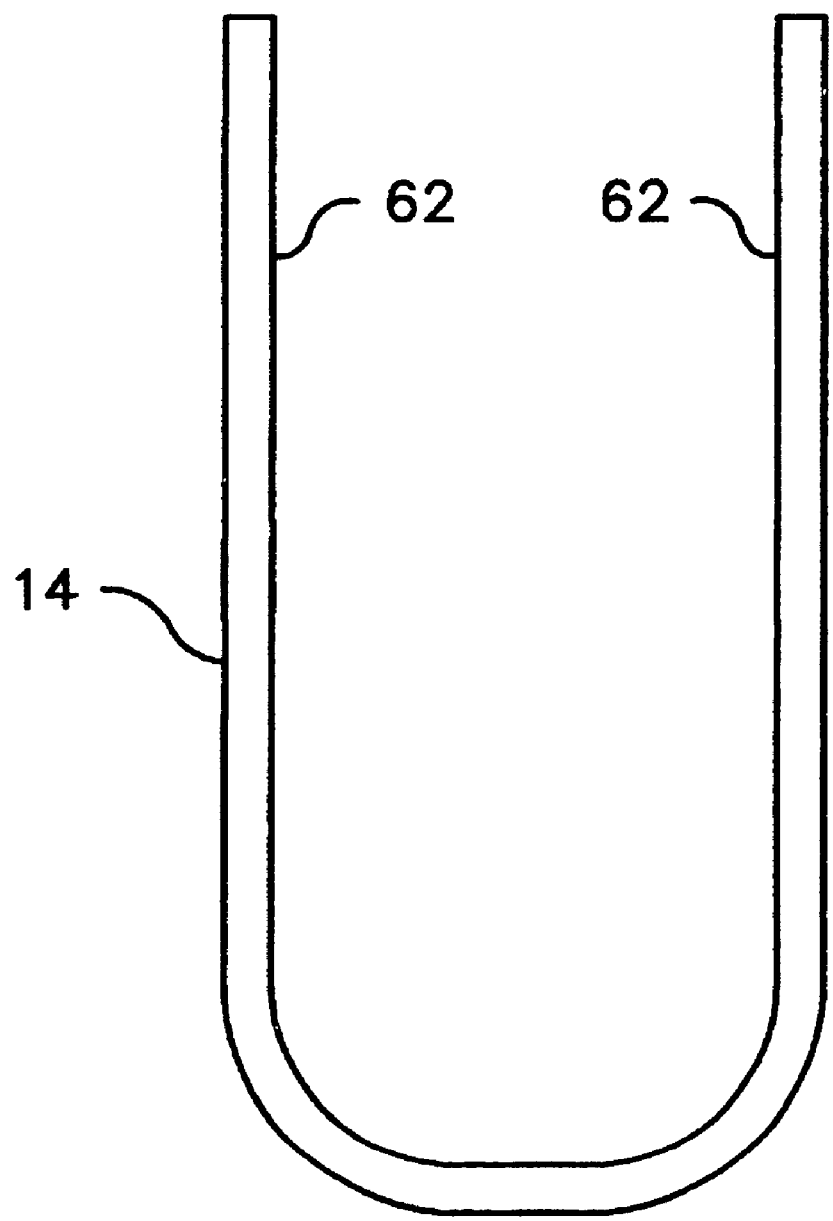
FIG. 11 is an elevational view of the secondary frame of the hand truck of FIG. 1.
Figure 12:
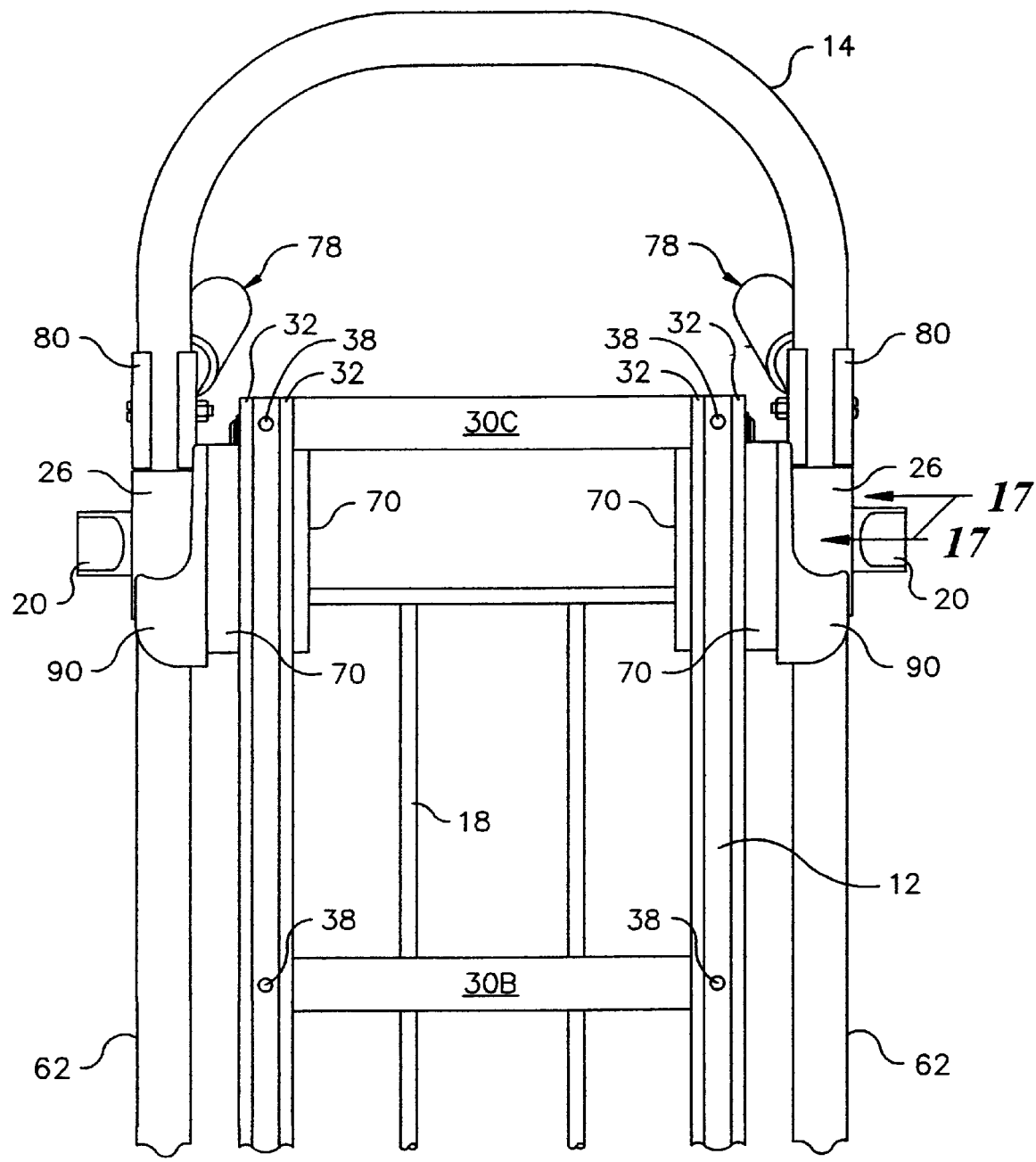
FIG. 12 is an enlarged partial front elevational view of the hand truck of FIG. 1 in a hand-truck-position.
Figure 15:
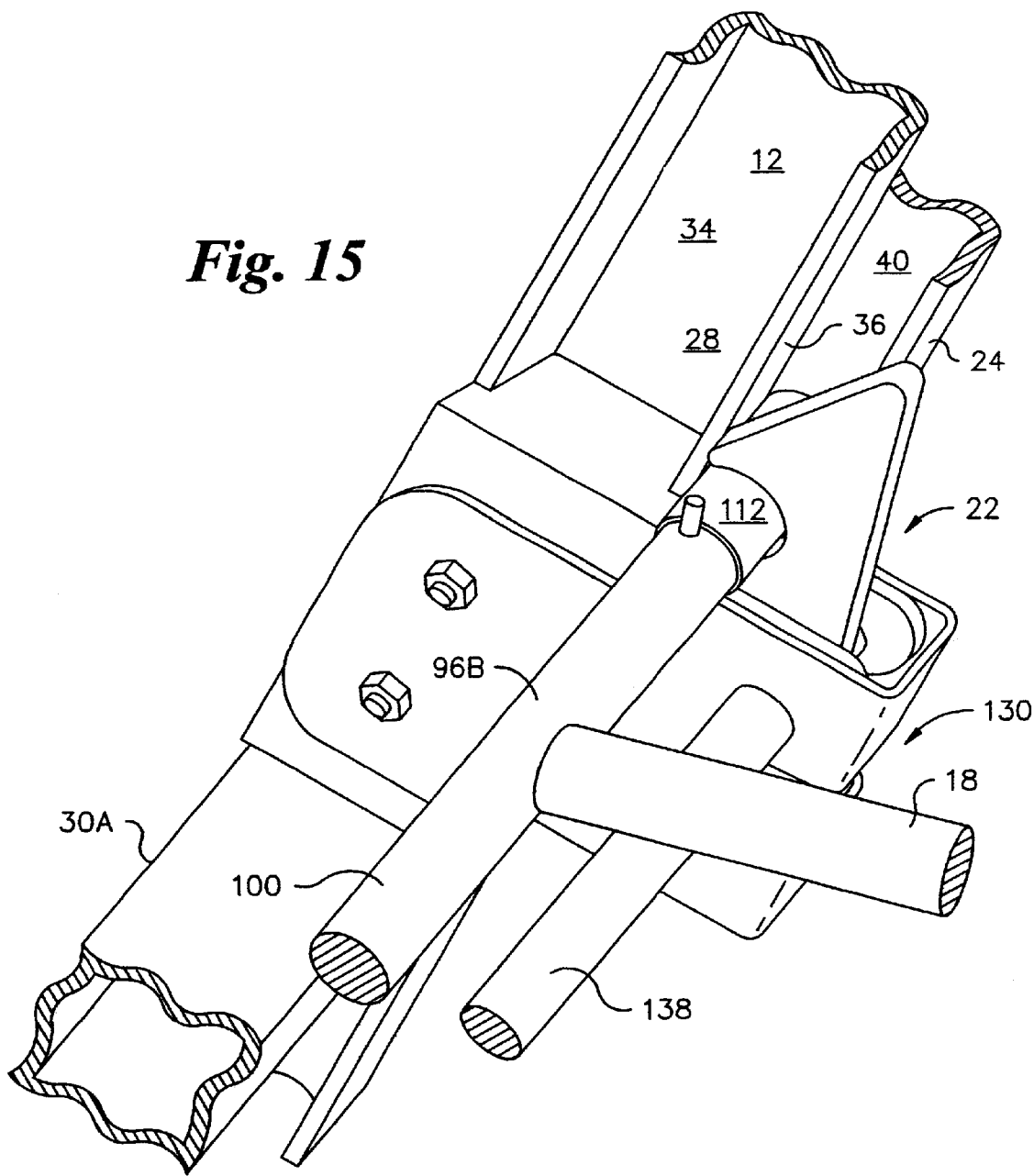
FIG. 15 is a greatly enlarged partial perspective view of the hand truck of FIG. 1 illustrating the connecting member secured by the second locking mechanism while the hand truck is in the inclined-cart-position.
Figure 16:
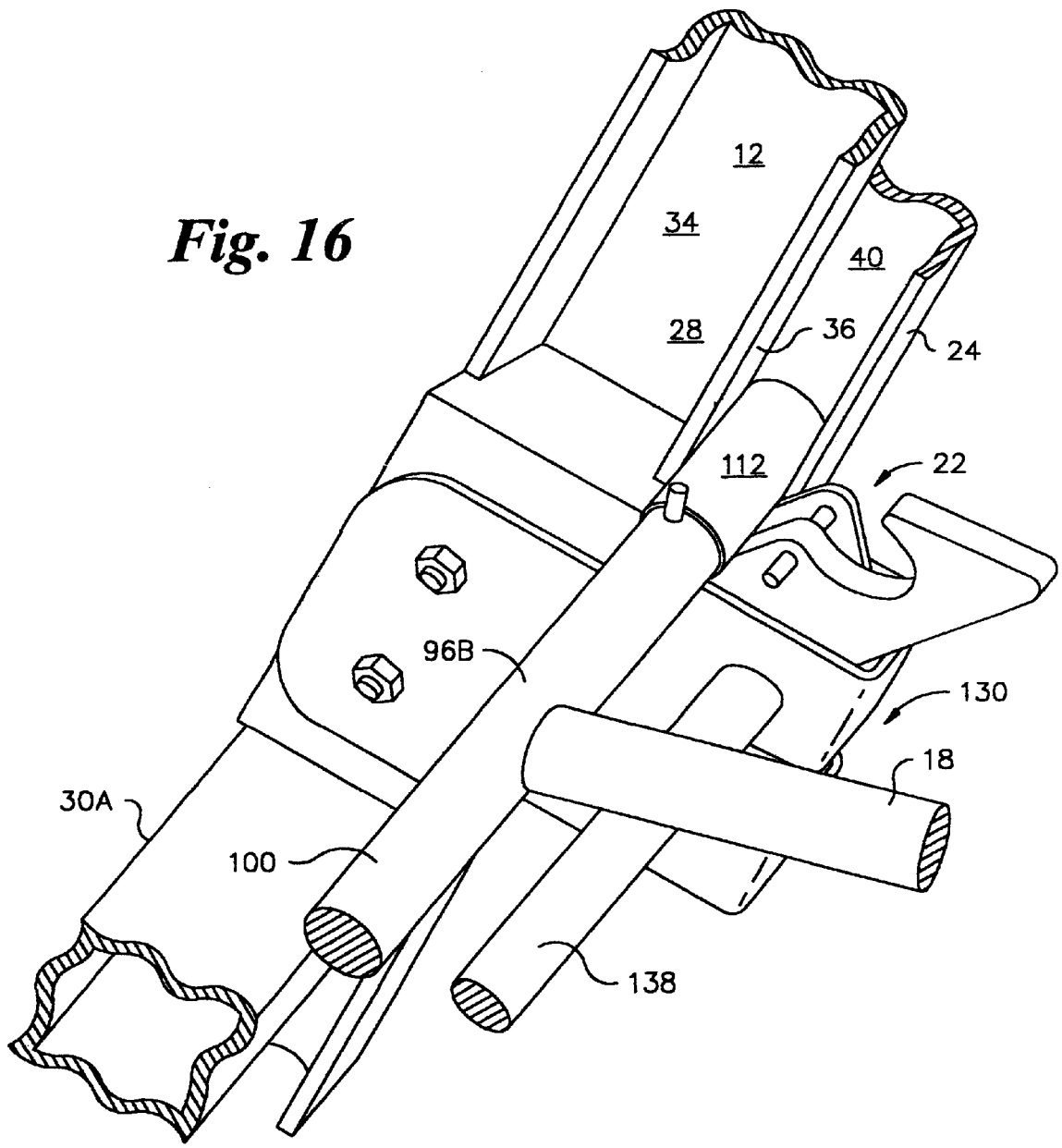
FIG. 16 is a greatly enlarged partial perspective view of the hand truck of FIG. 1 with the connecting member released from the second locking mechanism to allow the hand truck to be moved from the inclined-cart-position.

As best shown in FIGS. 10 and 12, each vertical strut 28 has a raised portion 32 along the left and right edges on the front side and the rear side (not shown). These raised portions 32 result from the type of beam (i.e., and I beam) used to form the vertical struts 28. In addition, as shown in FIGS. 10, 15 and 16, each vertical strut 28 has a groove 34 with a flange section 36 positioned on both the left and right sides of the groove 34. While this configuration is due to the particular beams chosen to construct the vertical struts 28 of the preferred embodiment, it is understood by those of ordinary skill in the art from this disclosure that the present invention is not limited to the type of beam shown in the drawings to construct the vertical struts 28. For instance, different types of I beams, T beams, rectangular tubing, and circular tubing can also be used to form the vertical struts 28.

As best shown in FIGS. 6 and 12, in the preferred embodiment of the present invention, the first, second and third crossbars 30A–30C are secured to the vertical struts 28 using fasteners 38 that are positioned on the left and right sides of the first, second and third crossbars 30A–30C. Thus secured, the first, second and third crossbars 30A–30C allow the primary frame 12 to support one side of an object (now shown) that is carried on the hand truck 10.

The primary frame 12 includes collars 26 (further described below) which are positioned on the upper left and upper right sides of the primary frame 12. A channel 40 is formed in the primary frame 12. Referring to FIGS. 3 and 16, the channel receives a connecting member 18 (further described below) which is attached to the secondary frame 14 and is slidably engaged with the channel 40 in the primary frame 12.

Figure 7:
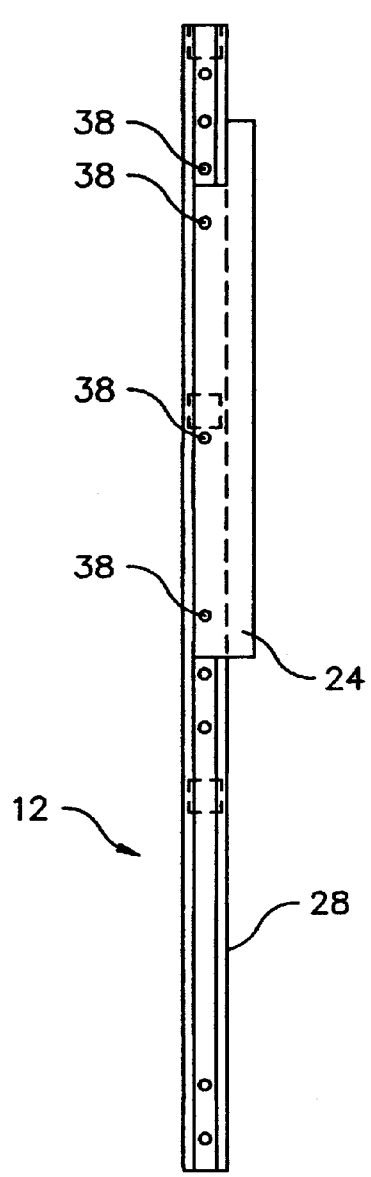
FIG. 7 is a left side elevational view of the primary frame of FIG. 6.

Referring to FIGS. 2, 15 and 16, the primary frame 12 preferably includes channel forming members 24 which are each positioned along the upper portion of the vertical struts 28. Referring to FIGS. 6 and 7, the channel forming members 24 are preferably formed by L-shaped plates which are attached via fasteners 38 to the outwardly facing sides of the vertical struts 28 and generally extend along the length of the upper portion of the hand truck 10. Each channel-forming member 24 extends rearwardly from the respective vertical strut 28 a predetermined distance from the rear edge of the respective vertical strut 28 and bends inwardly. Thus, each channel 40 is preferably formed between one channel forming member 24 and the respective vertical strut 28 for slidably receiving the connecting member 18. While it is preferable that the channels 40 are formed by channel forming members 24, those of ordinary skill in the art will appreciate from this disclosure that the channels 40 can be formed along the vertical struts 28 without departing from the scope of the present invention. The modifications to the preferred embodiment of the hand truck 10 necessary to form the channels 40 along the inner surface of the vertical struts 28 would be well known to those of skill in the art when considered in combination with this disclosure.

While it is preferred that the channel forming members 24 are separate components from the vertical struts 28, those of ordinary skill in the art will appreciate from this disclosure that the channel forming members 24 can be integrally formed, or cast, with the vertical struts 28 without departing from the scope of the present invention. As further described below, the channels 40 allow the connecting member 18 to move along the primary frame 12 depending upon the positioning of the secondary frame 14 without disengaging from the primary frame 12. Thus, since the connecting member 18 is slidably attached, if not detachably fixed, to the secondary frame 14, the secondary frame 14 can be moved through a variety of positions while maintaining a connection between the lower end of the secondary frame 14 and the channel forming members 24 via the connecting member 18.

Those of ordinary skill in the art will appreciate from this disclosure that other mechanisms can be used to slidably engage the connecting member 18 with the primary frame 12 without departing from the scope of the present invention. For example bars (not shown) could be positioned in a spaced apart generally parallel fashion from the vertical struts 28 to form slots (not shown) which are engaged with the connecting member 18.

Unless otherwise stated herein, the fasteners of the hand truck 10 are preferably formed of bolt and nut pairs. However, those of skill in the art will appreciate from this disclosure that the fasteners can be any combination of rivets, screws, snap-fit connections or welds without departing from the scope of the present invention. Additionally, it is preferred that the bolt and nut pairs are formed of a high strength, lightweight material such as aluminum or the like. However, it is understood by those of ordinary skill in the art from this disclosure that other materials, such as steel, stainless steel, or high density plastic can be used without departing from the scope of the invention.

Referring to FIG. 1, the wheels 16 are located on the lower end of the primary frame 12 on the right and left sides of the primary frame 12, and are used to bear the weight of items that are carried using the hand truck 10. The wheels 16 are constructed in a conventional manner as is well understood by those of skill in the art. As best shown in FIGS. 1 and 2, each of the wheels 16 is rotatably attached to a flange 42 which extends rearwardly from the outer side of the vertical struts 28. The wheels 16 are each mounted on a rim 44 which is attached to an end of an axle 46 using a cotter pin (not shown).

In the preferred embodiment of the present invention, the rims 44 are formed using a material that is highly corrosive resistant, strong and durable, such as high density plastic or the like. However, those of ordinary skill in the art will appreciate from this disclosure that the rims 44 can be formed of a variety of suitable materials, such as aluminum, stainless steel or the like.

The use of flanges 42 to support the wheels 16 allows a nose-piece 48 to have a wider width than would be possible if the pair of wheels 16 were attached directly to the lower end of the primary frame 12. Of course, if the pair of wheels 16 were mounted on the lower end of the primary frame 12 without using the flanges 42, then the nose-piece 48 would have a shorter width as measured from the lower left side to the lower right side of the primary frame 10 without otherwise affecting the operation of the present invention.

In the preferred embodiment of the present invention, each flange 42 is generally shaped in the form of a semi-trapezoid. However, the particular dimensions, or shape, of the flanges 42 are not crucial to the present invention. In the preferred embodiment of the present invention, the flanges 42 are attached to the outwardly facing sides of the vertical struts 28 along the lower portion of the vertical struts 28 using standard fasteners 38. While in the preferred embodiment of the present invention, the flanges 42 are attached to the bottom end of the vertical struts 28, the flanges 42 can be placed higher up along the vertical struts 28 than the positioning shown in FIGS. 1–5 depending on the size of the wheels 16 used with the primary frame 12.

As best shown in FIG. 3, the nosepiece 48 can be used for transporting heavy loads using the hand truck 10. The nosepiece 48 is preferably formed or cast as a single piece. The nose-piece 48 preferably includes a blade portion 50, two side panels 52 (which are positioned on the front side of the vertical struts 28), fastening panels 58 (which are positioned along the inner edges of the vertical struts 28) and a rear panel 56.

The blade portion 50 of the nosepiece 48 extends away from the primary frame 12 and preferably forms an angle of approximately ninety (90) degrees with the primary frame 12. However, those of skill in the art will appreciate from this disclosure that the particular angle between the blade portion 50 of the nosepiece 48 and the primary frame 12 can be varied without departing from the scope of the present invention.

The side panels 52 are preferably positioned on the front of the vertical struts 28 and the rear panel 56 is generally aligned with the rear side of the vertical struts 28. The side panels 52 and the rear panel 56 are preferably generally parallel to each other and are connected by fastening panels 58. The fastening panels 58 are preferably positioned along the inner surface of the vertical struts 28 and are attached thereto via fasteners 38. Essentially, the fastening panels 58, the blade portion 50 and the rear panels 56 combine to form a rectangular box-like projection that is inserted between the two vertical struts 28. While it is preferable that the nose-piece 48 is integrally formed, those of skill in the art will appreciate from this disclosure that the nose-piece 48 can be formed using discrete parts that are either fastened or welded together without departing from the scope of the present invention.

While the preferred embodiment of the nose-piece 48 is fastenably secured to the vertical struts 28, those of skill in the art will appreciate from this disclosure that the nose-piece 48 can be integrally formed or casted with the primary frame 12 or that the nose-piece 48 can be welded to the primary frame 12 in a manner known to those of skill in the art. Those of skill in the art will appreciate from this disclosure that the above-described structure of the nose-piece 48 can be varied without departing from the scope of the present invention.

Referring now to FIGS. 1, 3, 5, and 11, the secondary frame 14 is pivotally attached to the primary frame 12 and has at least one additional wheel 60 rotatably mounted thereon. The secondary frame 14 preferably has a U-shaped structure. The secondary frame 14 has legs 62 which extend downwardly and a crossbar 76 (further described below) that extends laterally across the secondary frame 14. The crossbar 76 is supported by side plates 94 which are attached to the outside of each of the legs 62. Thus, the crossbar 76 is supported in a spaced apart fashion from each of the legs 62 of the secondary frame 14. Each of the legs 62 is preferably pivotally attached to the primary frame 12 via collars 26.

Figure 18:
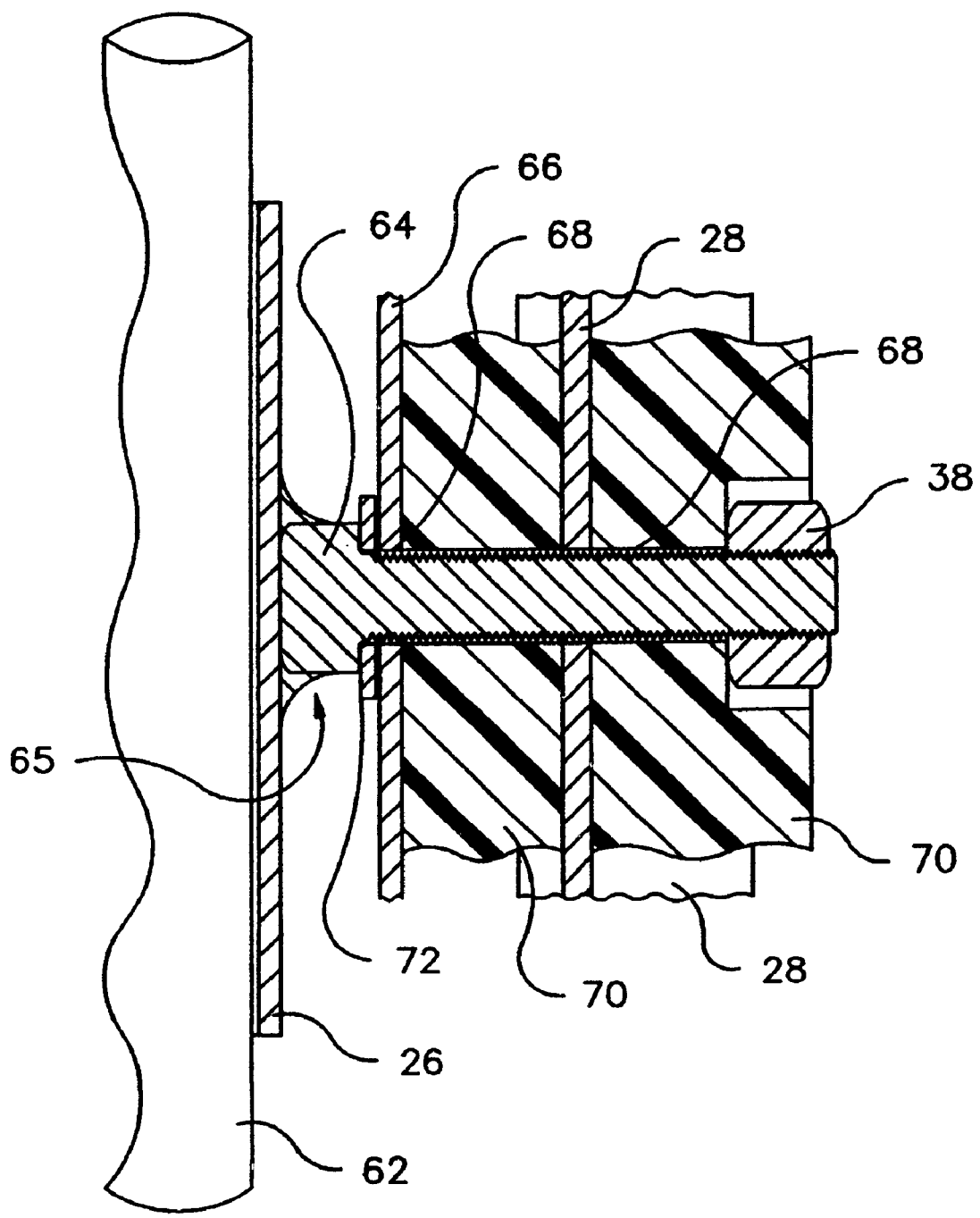
FIG. 18 is a partial cross-sectional view of a collar of the hand truck of FIG. 3 as taken along the line 18—18 in FIG. 3.
Figure 20:
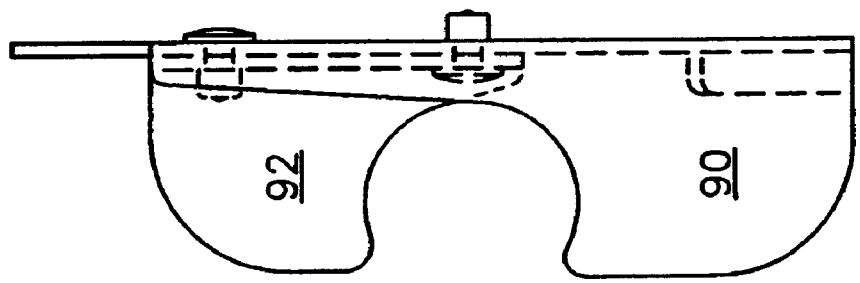
FIG. 20 is an enlarged front elevational view of the upper flange of FIG. 19.

As best shown in FIG. 18, the collars 26 are each attached to a shaft 64 which extends laterally through the corresponding vertical strut 28 and is secured by a fastener 38. The shaft 64 extends through a bore 68 in the vertical strut 28 (the bore 68 is in the portion of the vertical strut 28 that forms the stem of the I beam and that is shown in cross-section) and protrudes past the outer surface of the vertical strut 28 to support the collar 26 at a predetermined distance from the vertical strut 28. The bore 68 and the shaft 64 are preferably oriented generally perpendicularly to the longitudinal axis of the respective vertical strut 28. It is preferable that the primary frame 12 includes at least one collar 26 for slideably and pivotally engaging the secondary frame 14.

Referring to FIG. 18, on both sides of the stem portion of the vertical strut 28 is a plastic, or polymeric, element 70. The plastic element, or spacer, 70 on the left side of the stem of the vertical strut 28 is interposed between the stem portion of the vertical strut 28 and an upper flange 66 (further described below). The shaft 64 extends through both plastic elements 70, the vertical strut 28 and the upper flange 66. The portion of the shaft 64 that extends leftward from the upper flange 66 toward the collar 26 is larger in diameter than the bore 68. This difference in diameters, in combination with the fastener 38, secures the shaft 64 to the vertical strut 28. Preferably, a metallic washer 72 is disposed between the larger portion of the shaft 64 which protrudes past the outer surface of the upper flange 66 located on the plastic element 70 positioned on the outer side of the stem of the vertical strut 28.

Though the washer 72 is preferably formed of a metallic material, those of ordinary skill in the art will appreciate from this disclosure that other materials can be used to form the washer 72 without departing from the scope of the present invention. Additionally, while it is preferred that elements 70 are formed using a plastic material, those of skill in the art will understand from this disclosure that the type of material used to form the elements, or spacers, 70 is not critical to the present invention.

While the shaft 64 is preferably welded to the collar 26, those of skill in the art will appreciate from this disclosure that the collar 26 and the shaft 64 can be integrally molded or cast. Thus, once the collar 26 is attached to the vertical strut 28 via the shaft 64, the collar 26 can pivotally rotate about the longitudinal axis of the shaft 64. This allows the secondary frame 14 to rotate with respect to the primary frame 12 and to slide through the collars 26.

The second pair of wheels 60 of the secondary frame 14 are each preferably attached to the end of a leg 62 of the secondary frame 14 via a rotating mount 74. Referring to FIG. 1, the second pair of wheels 60 are generally aligned with the sides of the primary frame 12 when the hand truck 10 is configured to be used as a typical hand truck. While the preferred embodiment of the hand truck 10 has a pair of wheels 60 attached to the secondary frame 14, those of skill in the art will appreciate from this disclosure that the secondary frame 14 can have a single wide-width wheel 60 attached at a location generally centrally aligned between the wheels 16 of the primary frame 12 without departing from the scope of the present invention.

Figure 24:
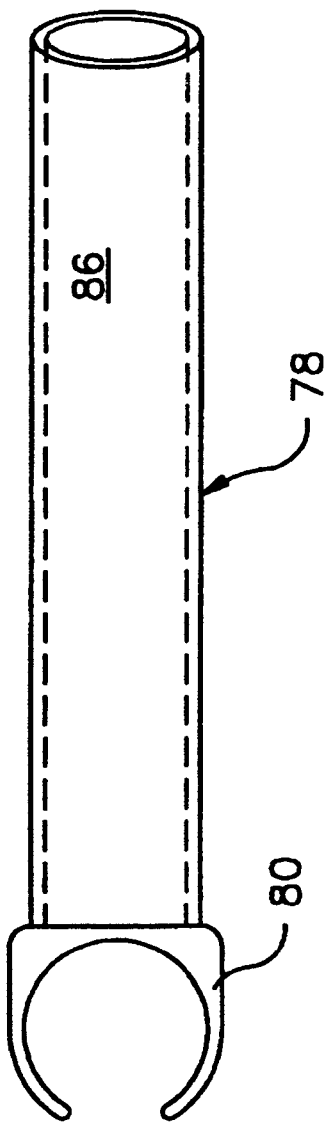
FIG. 24 is an enlarged top planar view of the handle of FIG. 23.
Figure 23:
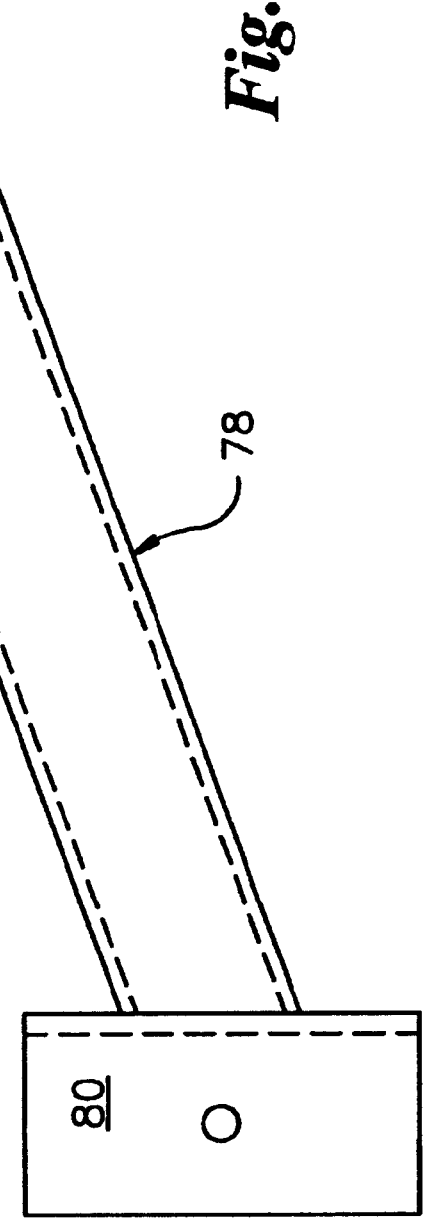
FIG. 23 is an enlarged left side elevational view of a handle of the hand truck of FIG. 1.

Referring to FIGS. 1, 23 and 24, the secondary frame 14 preferably, but not necessarily, includes handles 78 to simplify the operation of the hand truck 10. One handle 78 is preferably attached to each leg 62 of the secondary frame 14 via a handle securing clasp 80 which is secured to the secondary frame by a fastener 38. Referring to FIGS. 25-28, the handle-securing clasp 80 is preferably formed from a generally rectangular sheet of material. The handle securing clasp 80 has a first set of holes 82 which are used to fasten the handle securing clasp 80 to the leg 62 of the secondary frame 14.

The handle securing clasp 80 is preferably, but not necessarily, bent into the shape shown in FIG. 25 and is secured to the secondary frame 14 to form a protrusion 84 that extends rearwardly from the leg 62 of the secondary frame 14. The bars 86 which form the handle are preferably, but not necessarily, generally circular tubes formed of material similar to that of the primary frame 12. The bars 86 are preferably slidably engaged over the protrusion 84 of the handle securing clasp 80 and welded to the secondary frame 14. While a preferred structure for the handles 78 has been described, those of ordinary skill in the art will appreciate from this disclosure that various handle 78 designs can be used with the hand truck 10 without departing from the scope of the present invention. For example, the bars 86 can be welded directly to, or cast with, the secondary frame 14 without departing from the scope of the present invention.

The handles 78 extend rearwardly and slightly upwardly from the secondary frame 14 and each supports a grip 88 on an end opposite from the secondary frame 14. The grip 88 is preferably formed of a rubber or thermoplastic material that simplifies the handling of the hand truck 10. While it is preferable to have a grip portion 88 formed of a material, such as rubber or a suitable thermoplastic material, those of ordinary skill in the art will appreciate from this disclosure that the grip 88 is not pertinent to the present invention and, accordingly, is not further described herein.

Figure 5:
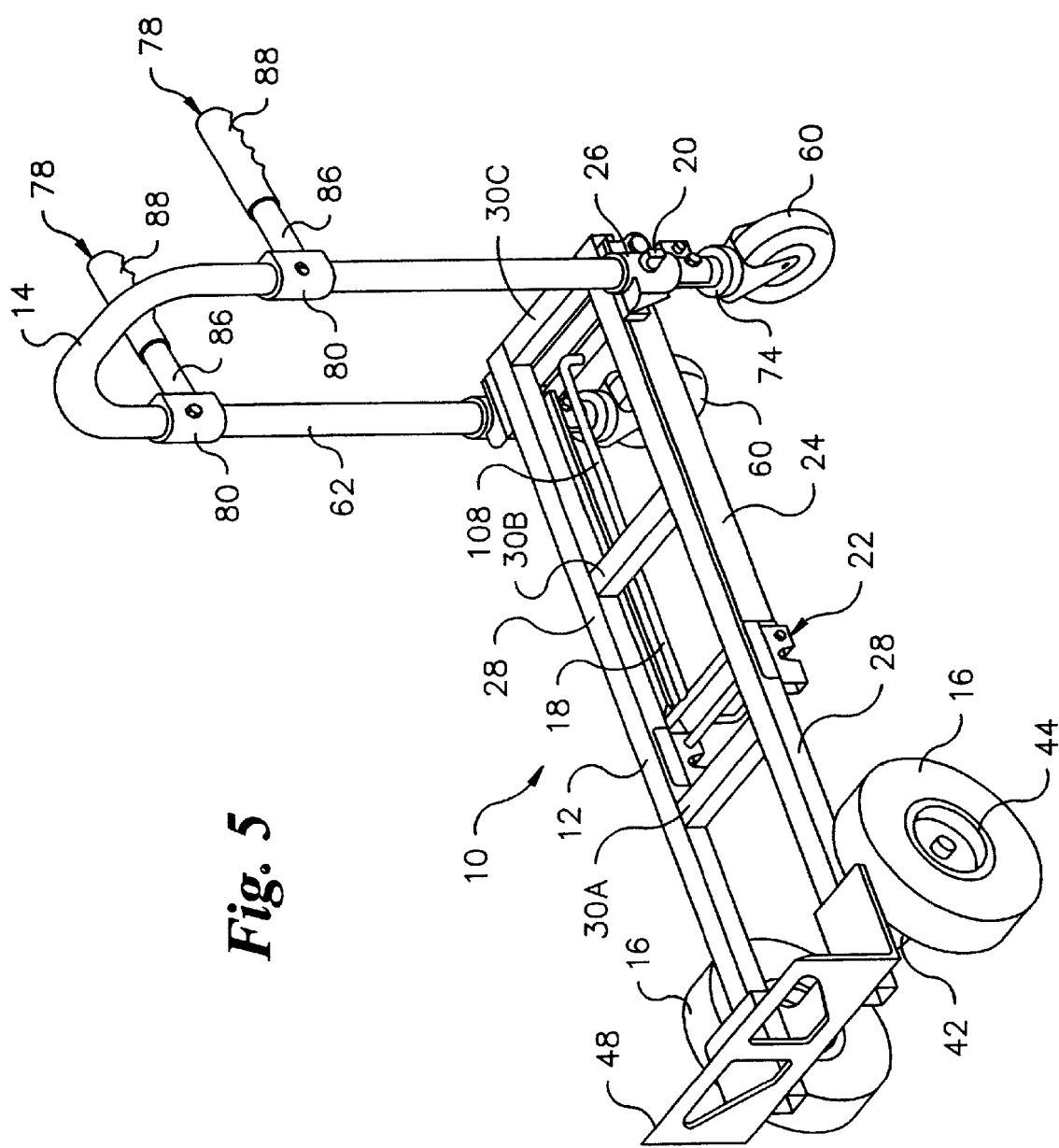
FIG. 5 is a perspective view of the hand truck of FIG. 1 in the cart-position.

Referring to FIGS. 3, 5 and 18, while the secondary frame 14 preferably has a U-shape, those of ordinary skill in the art will appreciate that the shape of the secondary frame 14 is not pertinent to the present invention. One important aspect of the shape of the secondary frame 14 is that the secondary frame 14 is pivotable about the primary frame 12 and slidable through the collars 26.

The secondary frame 14 is movable into a position selected from any one of the group consisting of a hand-truck-position (shown in FIGS. 1, 10 and 12), generally parallel to the primary frame 12, a cart-position (shown in FIG. 5), generally perpendicular to the primary frame 12, and an inclined-cart-position (shown in FIGS. 2 and 3), generally positioned at a predetermined angle with respect to the primary frame 12. The secondary frame 14 pivots with respect to the primary frame 12 by pivoting about the rotational axis of the shaft 64 supporting the collars 26.

When the secondary frame 14 is in the hand truck position (as shown in FIGS. 1 and 10), the legs 62 protrude downwardly through the collars 26 which generally abut a hand truck stop plate 90 of the upper flange 66. The hand truck stop plate 90 is preferably oriented generally perpendicular to upper flange 66 and projects outwardly from the primary frame 12.

The hand truck stop plate 90 limits the rotation of the secondary frame 14 in the clockwise direction (as viewed in FIG. 1) to prevent the secondary frame from rotating past the hand-tuck-position.

Figure 19:
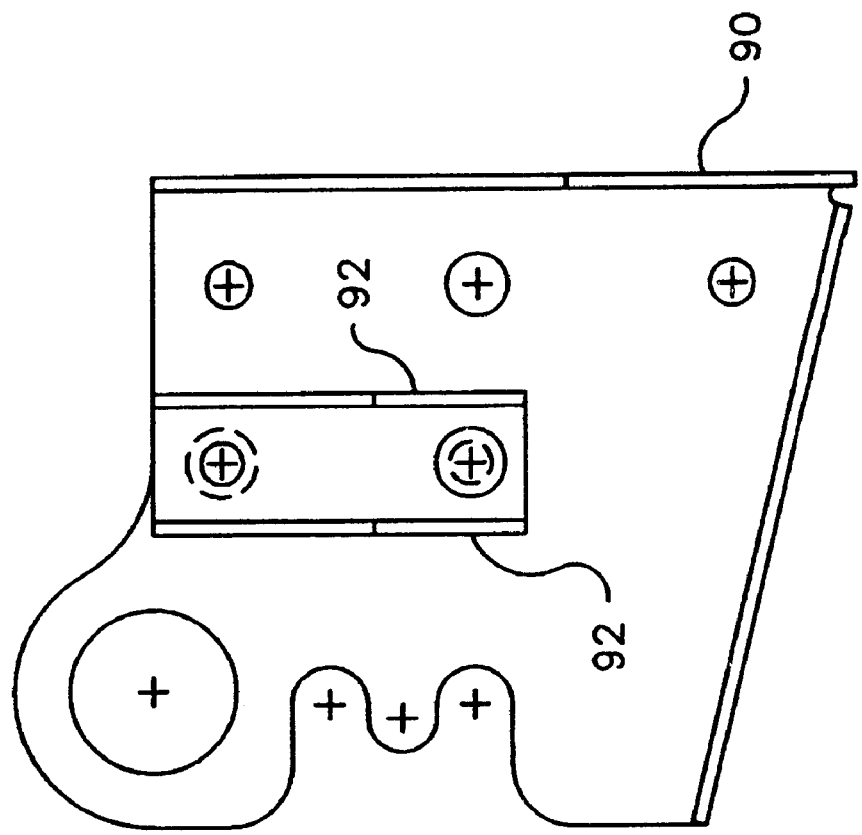
FIG. 19 is an enlarged right-side elevational view of an upper flange of the hand truck of FIG. 1.
Figure 21:
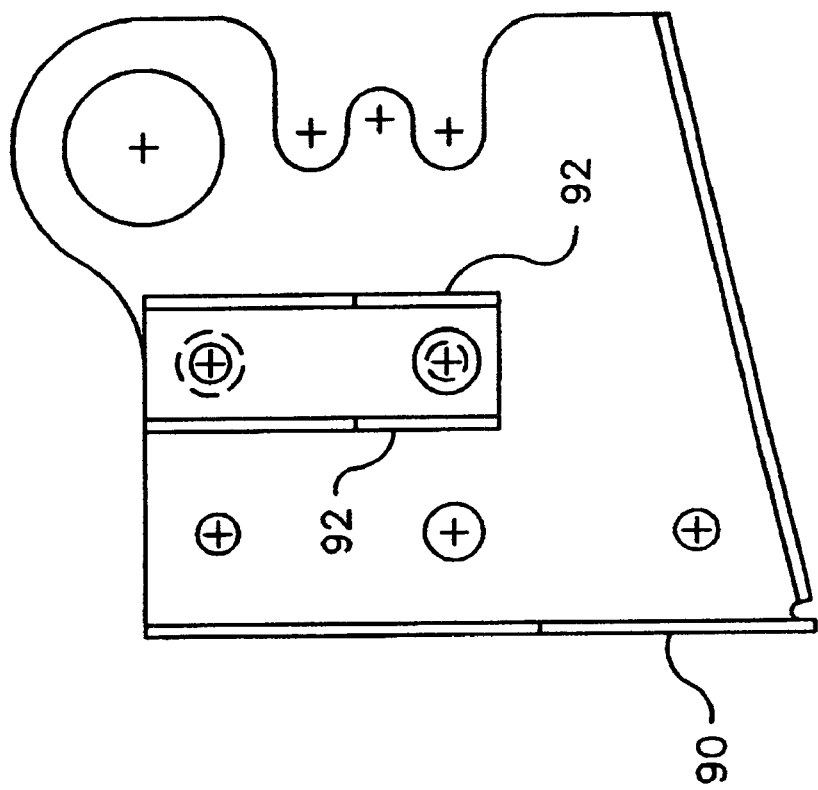
FIG. 21 is an enlarged left-side elevational view of another upper flange of the hand truck of FIG. 1.
Figure 22:
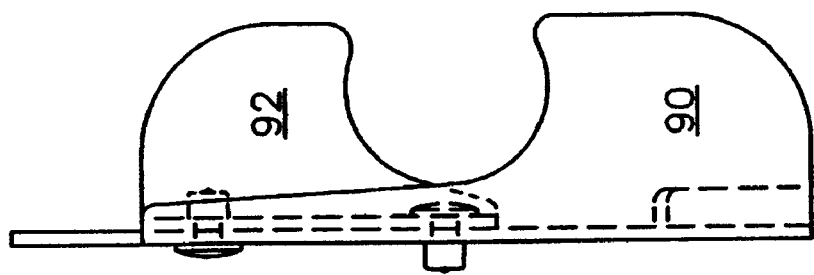
FIG. 22 is an enlarged front elevational view of the upper flange of FIG. 21.

Referring to FIG. 5, when the secondary frame 14 is in the cart-position, the legs 62 of the secondary frame 14 extend upward from the collars 26. Referring to FIGS. 19 and 21, the collars 26 are maintained in a generally perpendicular orientation relative to the primary frame 12 to secure the secondary frame 14 in the cart-position.

Figure 4:
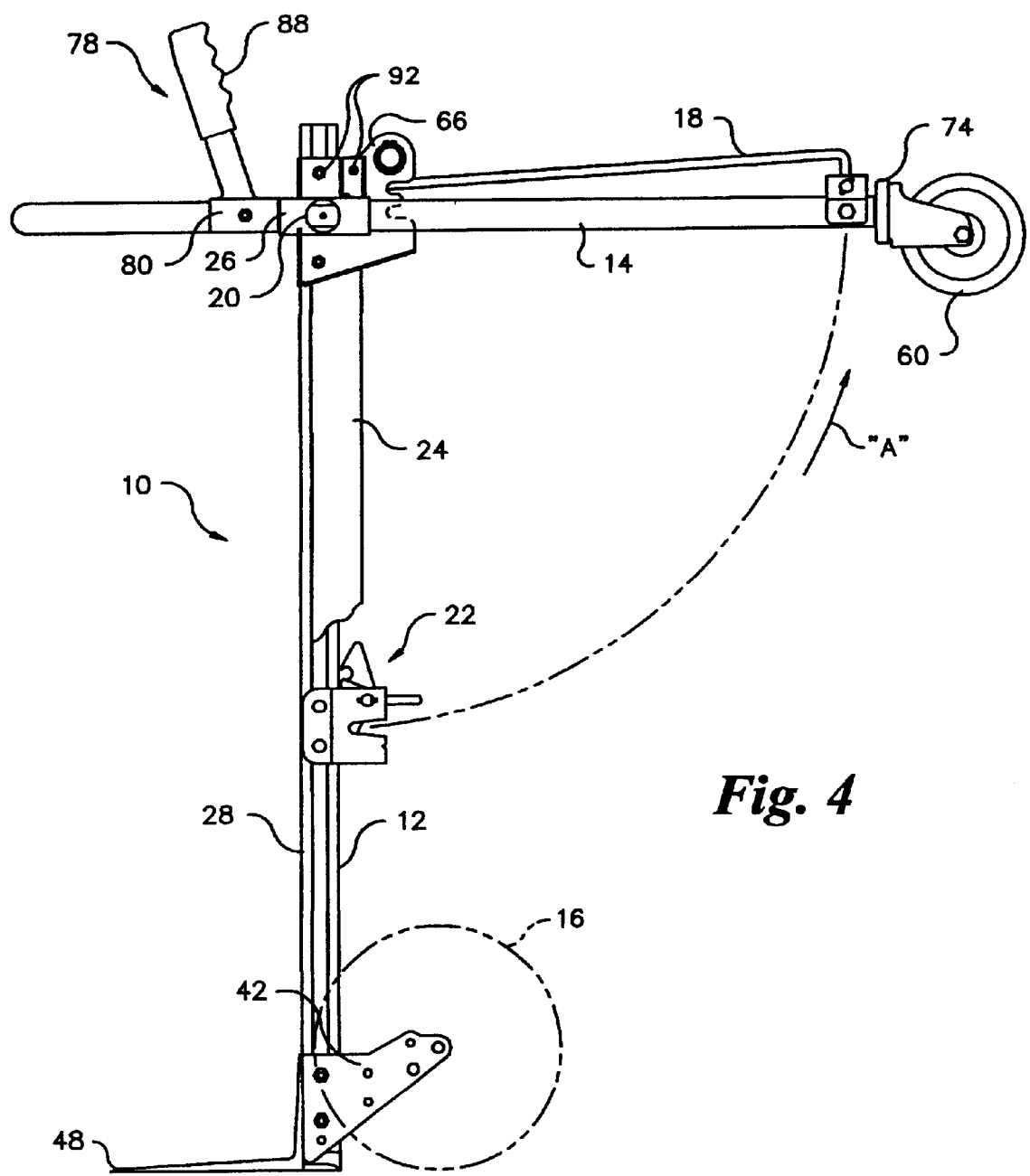
FIG. 4 is a left side elevational view of the hand truck of FIG. 1 with the secondary frame partially maneuvered into a cart-position.

To secure the collars 26 in the proper position, it is preferable, but not necessary, that two (2) cart stop plates 92 extend generally outwardly from each upper flange 66 in a generally parallel alignment with the primary frame 12. Referring to FIG. 4, the cart stop plates 92 limit the rotation of the secondary frame 14 in the counter-clockwise direction (as denoted by the arrow "A") to prevent the secondary frame 14 from rotating past the cart-position.

When the secondary frame 14 is in the inclined-cart-position (shown in FIGS. 2 and 3), the legs 62 of the secondary frame 14 are positioned such that the collar 26 generally askew relative to the primary frame 12. Thus, the collars 26 are angled between the respective hand truck stop plate 90 and the respective cart stop plate 92.

To move the secondary frame 14 from the hand-truck-position to the inclined-cart-position, the connecting member 18 is released (further described below) and the secondary frame 14 is rotated in the counterclockwise direction (shown by the arrow denoted "A" in FIG. 2) until the secondary frame 14 reaches a predetermined angle and the connecting member 18 is again secured in position on the primary frame 12 (further described below). To move the secondary frame 14 from the inclined-cart-position into the cart-position, a first locking mechanism 20 (further described below) is released and the secondary frame 14 is further rotated counterclockwise while the secondary frame 14 is slid leftwardly through the collars 26 (as viewed in FIG. 4) until the secondary frame 14 is secured in the cart-position (shown in FIG. 5 and further described below). The secondary frame, while in either one of the inclined-cart-position and the cart-position, causes the at least one additional wheel 60, in combination with the first pair of wheels 16, to be capable of supporting the primary frame 12.

Figures 13, 14:
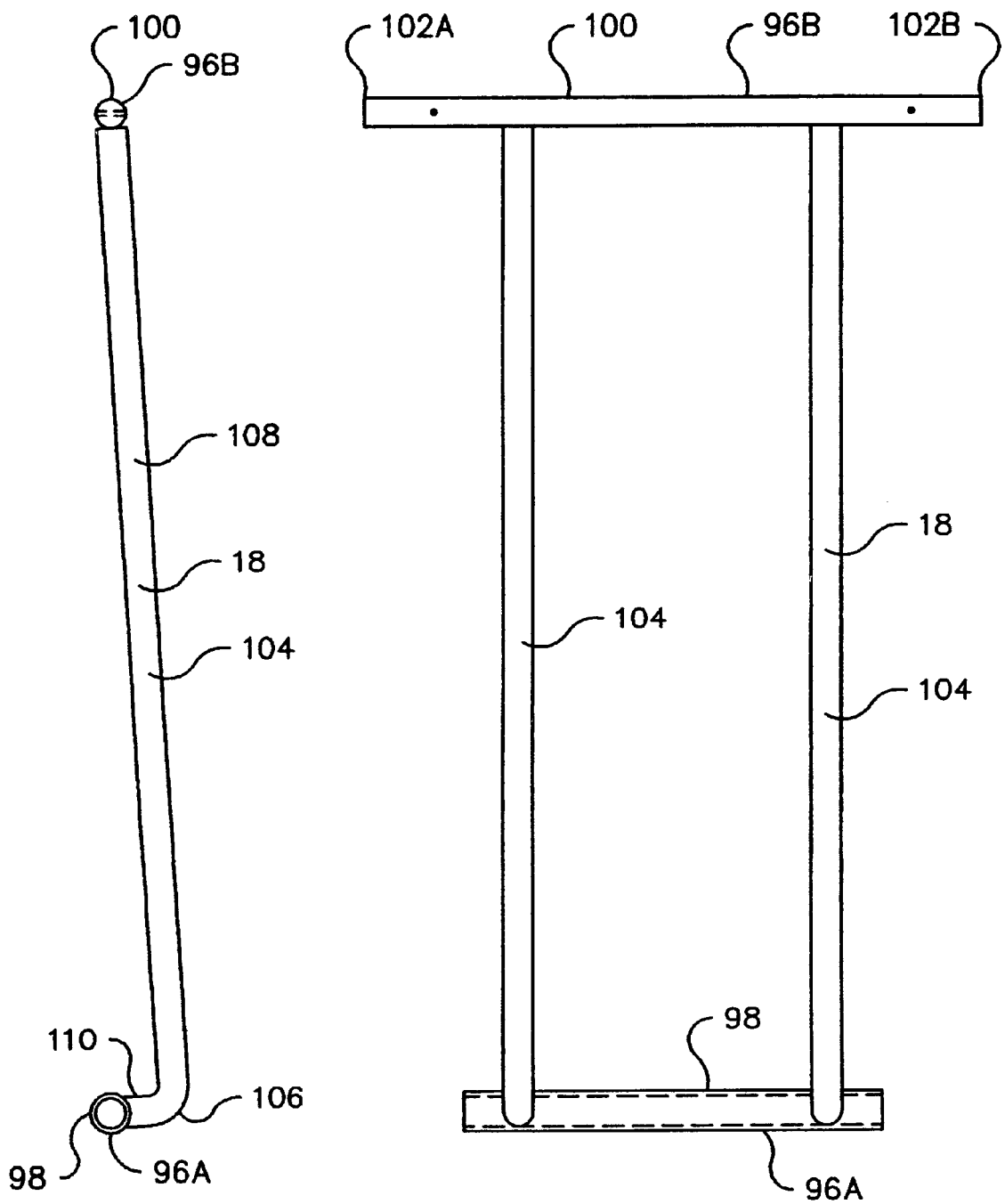
FIG. 13 is a top planar view of a connecting member of the hand truck of FIG. 1.
FIG. 14 is a left side elevational view of the connecting member of the hand truck of FIG. 1.

As mentioned above, the connecting member 18 is attached to the secondary frame 14. Referring to FIGS. 13 and 14, the connecting member 18 has first and second ends 96A, 96B which engage the secondary frame 14 and the primary frame 12, respectively. A hollow tubular member 98 forms the first end 96A of the connecting member 18 and is rotatably positioned over the crossbar 76 of the secondary frame 14. The second end 96B of the connecting member 18 is formed by a rod 100 which has first and second ends 102A, 102B. Two L-shaped bars 104 preferably, but not necessarily, connect the hollow tubular member 98 to the rod 100. The L-shaped bars 104 are preferably positioned in a generally parallel fashion relative to each other.

Referring to FIG. 14, each of the L-shaped bars 104 has a bend 106 proximate to the first end 96A. Referring to FIG. 14, the shape of the bar 104 (while moving along the bar 104 from the first end 96A to the second end 96B) which initially extends generally rightwardly (as viewed in FIG. 14) from the hollow tubular member 98 for a predetermined distance and then, turns upwardly forming bend 106 and extends toward the second end 96B of the connecting member 18. The generally rightwardly skew of the elongated portions 108 of the L-shaped bars 104 caused by the shorter portions 110 of the bars 104 results in the elongated portions 108 of the L-shaped bars 104 being generally aligned parallel with the channel 40 when the secondary frame 14 is in the cart-position. The bend 106 of the bars 104 of the connecting member 18, combined with the rotatable mounting of the hollow tubular member 98 onto the crossbar 76 of the secondary frame 14, compensates for the slightly different distance between the crossbar 76 and a second locking mechanism 112 (further described below) depending upon whether the secondary frame 14 is in the inclined-cart-position or in the cart-position.

Referring to FIG. 1, the bend 106 in the L-shaped bars 104 also prevents interference between the bars 104 and the second locking mechanism 22 when the secondary frame 14 is in the hand-truck-position. While it is preferred that the ends 96A, 96B of the connecting member 18 be connected by L-shaped bars 104, those of ordinary skill in the art will appreciate from this disclosure that various structures, such as an elongated plate (not shown) or a strip of suitably rigid material (not shown), can be used to connect the hollow tubular member 98 to the rod 100 without departing from the scope of the present invention.

As partially shown in FIGS. 15 and 16, the first and second ends 102A, 102B of the rod 100 of the connecting member 18 preferably each have a bushing 112 positioned thereon to slidably engage one of the channels 40 formed by the channel forming members 24. The bushings 112 are preferably, but not necessarily, formed of wear resistant, low friction material, such as brass or the like. Those of skill in the art will appreciate from this disclosure that other suitable wear-resistant, low-friction materials such as stainless steel, aluminum or the like may be used to form the bushings 112 without departing from the scope of the present invention. It is preferred, but not necessary, that either the channel 40 has a mild lubricant positioned thereover or that the bushings 112 are lubricant impregnated to further facilitate the sliding action between the connecting member 18 and the primary frame 12. Thus, the connecting member 18 is slidably engaged with the channel 40 via the bushings 112.

Referring to FIG. 1, when the secondary frame 14 is in the hand-truck-position, the elongated portions 108 of the L-shaped bars 104 of the connecting member 18 are mildly askew from the primary frame 12. Referring to FIG. 3, when the secondary member 14 is secured in the inclined-cart-position, the connecting member 18 forms a generally triangular shape in combination with the upper portion of the primary frame 12 and the upper portion of the secondary frame 14. As best seen in FIG. 5, when the secondary frame 14 is in the cart-position, the elongated portions 108 of the L-shaped bars 104 are generally parallel to the primary frame 12.

Figure 17:
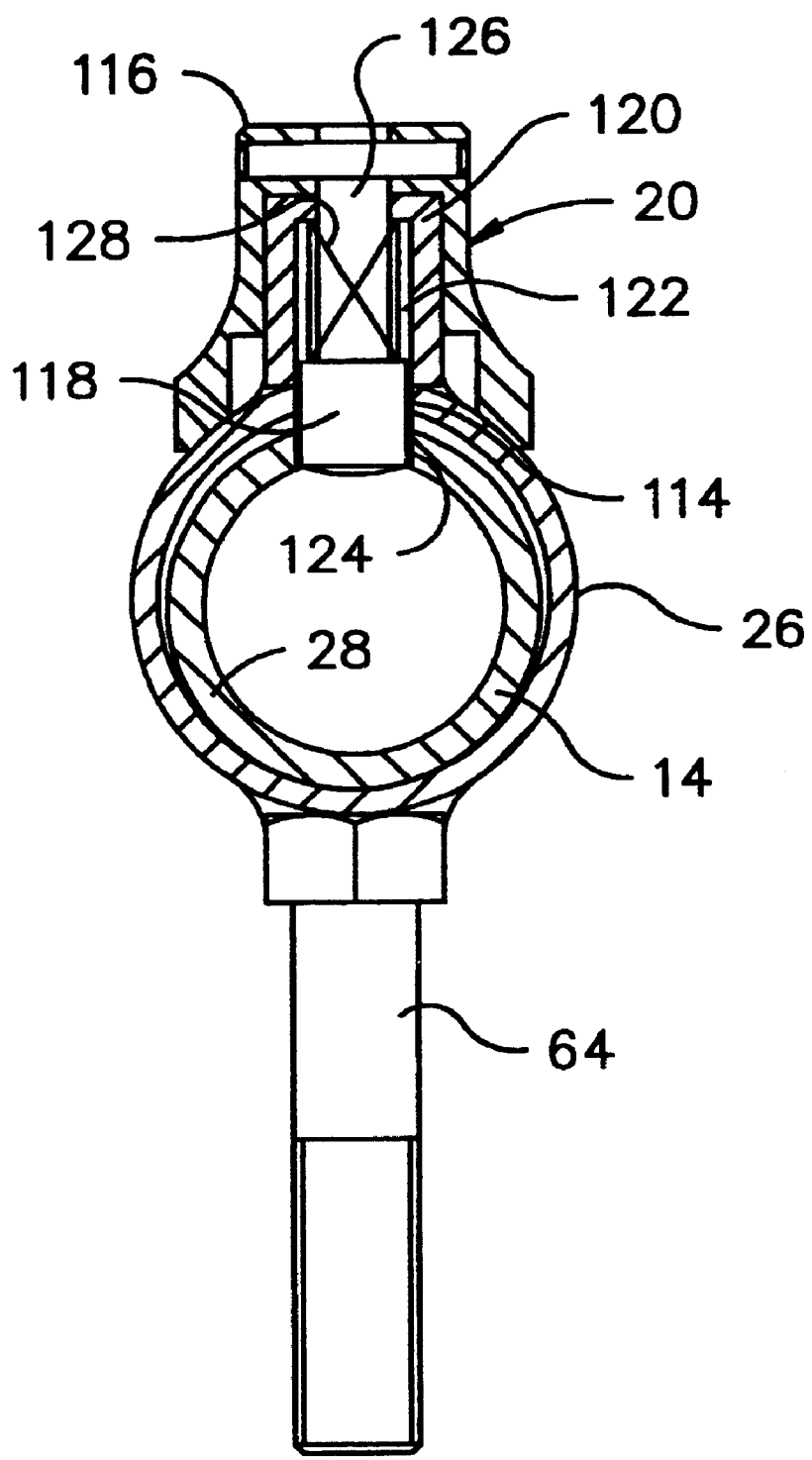
FIG. 17 is an enlarged cross-sectional view of the first locking mechanism of the hand truck of FIG. 12 as taken along the line 17—17 in FIG. 12.

Referring to FIGS. 12 and 17, a first locking mechanism 20 is attached to the primary frame 12 and detachably secures the secondary frame 14 to the primary frame 12 while the secondary frame is in the hand-truck-position and while the secondary frame is in the inclined-cart-position. The first locking mechanism 20 includes a detent mechanism 114 positioned on at least one collar 26. The detent mechanism 114 detachably engages a hole 124 in the secondary frame 14 to fix the position of the secondary frame 14 within the collar 26.

The first locking mechanism 20 includes a knob 116 which is movably positioned on the collar 26 and is generally aligned with the hole 124 that receives a plug 118 from the first locking mechanism 20 to secure the secondary member 14 in position within the collar 26. A chamber 120 substantially surrounds the hole 124 and extends generally outwardly from the collar 26. A bore 122 extends through the chamber 120 and is aligned with the hole 124.

The knob 116 is slidably positioned over the chamber 120 and has a plunger 126 which extends from an inner surface of the knob 116 into the bore 122 in the chamber 120. The plunger 126 supports the plug 118 on an end opposite from the knob 116. An elastic member 128 is positioned between the plug 118 and a lip of the chamber 120 to bias the plug 118 toward the hole 124 in the secondary frame 14.

To disengage the first locking mechanism 20 from the secondary frame 14, the knob 116 is displaced outwardly from the collar 26 causing the elastic member 128 to compress and causing the plug 118 to be withdrawn from the hole 124 in the secondary frame 114. Thus, by removing the plug 118 from its biased position, the secondary frame 14 is free to slide within the collar 26. While in the preferred embodiment of the hand truck 10 a separate first locking mechanism 20 is positioned on each collar 26, those of ordinary skill in the art will appreciate from this disclosure that a single first locking mechanism 20 may be used on one of the collars 26 without departing from the scope of the present invention. Additionally, while a preferred embodiment of the first locking mechanism has been described, those of skill in the art will appreciate from this disclosure that various mechanisms can be used as the first locking mechanism 20 without departing from the scope of the present invention. For example, the first locking mechanism 20 can use battery-powered solenoids (not shown) or similar electrical devices to allow a user to disengage the first locking mechanism 20 without having to exert as much force as is required with the manual removal of the plug 118 from the secondary frame 14.

The second locking mechanism 22 is attached to the rear side of the primary frame 12 generally midway along the length of the primary frame 12 and detachably secures the connecting member 18 to the primary frame 12 while the secondary frame 14 is in the inclined-cart-position (shown in FIGS. 2 and 3). While it is preferred that two cam locking devices 130 be used as the second locking mechanism 22, those of skill in the art will appreciate from this disclosure that a single cam-locking device 130 can be used as the second locking mechanism 22 without departing from the scope of the present invention. As further described below, the second locking mechanism 22 is engagable with the secondary frame 14 when the secondary frame 14 is in the hand-truck-position and the second locking mechanism 22 is engagable with the connecting member 18 when the secondary frame 14 is in the inclined-cart-position.

Figure 8:
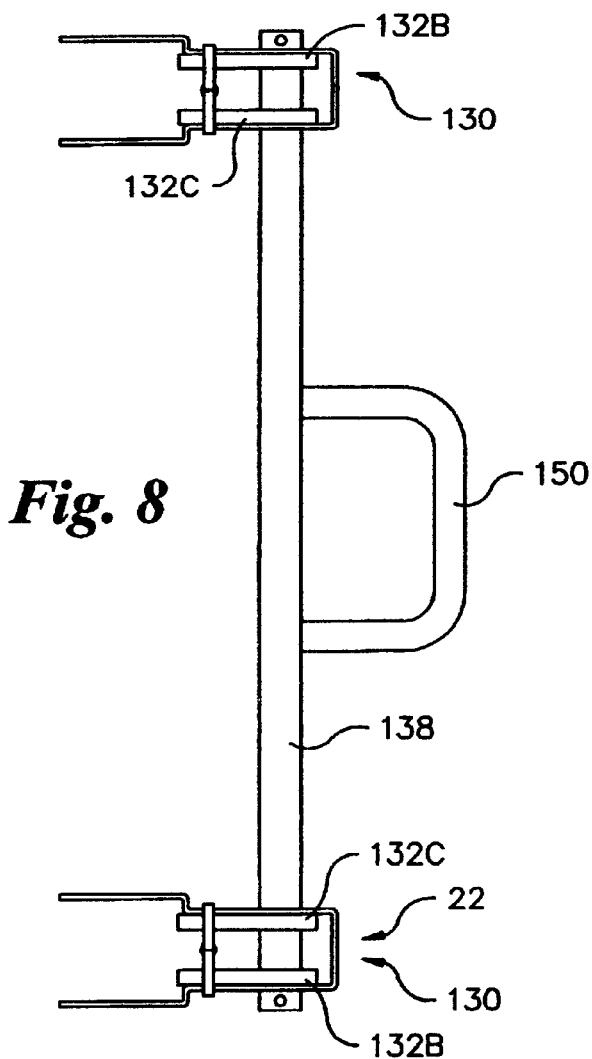
FIG. 8 is a top planar view of a second locking mechanism of the hand truck of FIG. 1.
Figure 9:
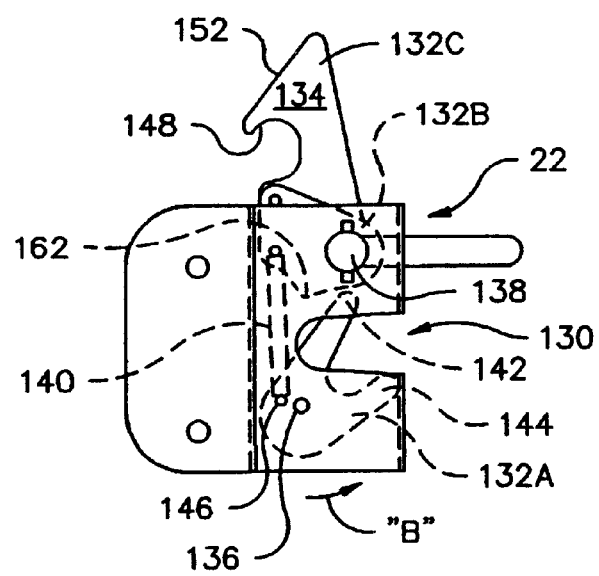
FIG. 9 is a left side elevational view of the second locking mechanism of FIG. 8.

Referring to FIGS. 8 and 9, the second locking mechanism 22 is preferably a cam locking device 130 positioned on each side of the primary frame 12. Each cam locking device 130 preferably has first, second, third and forth cams, or bar-securing rockers, 132A–132D (referring to FIG. 9, the fourth cam 132D is positioned directly behind the first cam 132A and is generally similarly shaped and thus, is not viewable). The second and third cams 132B, 132C are preferably generally identically shaped except for the additional upper hook portion 134 positioned on the third cam 132C.

As further explained below, the upper hook portion 134 allows the cam locking device 130 to detachably secure the rod 100 of the connecting member 18. Thus, the second locking mechanism 22 is movable between a connecting-member-lock-position, in which the connecting member 18 is secured in position along the primary frame 12 (shown in FIG. 15), and a connecting-member-unlocked-position, in which the connecting member 18 is not secured in position along the primary frame 12 (shown in FIG. 16).

The first and fourth cams 132A, 132D are preferably secured to the cam locking device 130 via a pin 136. Preferably, a separate elastic member 140, in the form of a coil spring, connects the first and second cams 132A, 132B and the third and fourth cams 132C, 132D, respectively. The second and third cams 132B, 132C are preferably mounted on a cam axle 138 which rotatably supports the second and third cams 132B, 132C over the first and fourth cams 132A, 132D. The second and third cams 132B, 132C each have a protuberance 162 which, due to the biasing of the elastic member 140, abuttingly braces the left side (as viewed in FIG. 9) of the first leg of the first and fourth cams 132A, 132D to maintain the cam locking device 130 in a position that does not secure the crossbar 76.

To adjust the position of the cams 132A–132D in the cam locking device 130, force must be applied to one of a cam lock release handle 150 and an angled surface 152 of the upper hook portion 134. If a greater force is applied than the biasing force created by the elastic member 140, then the upper hook portion 134 oscillates into the connecting-member-unlocked-position and then, back into the connecting-member-locked position. Additionally, the first and fourth cams 132A, 132D move into positions in which the crossbar 76 is not secured to the secondary frame 14.

If a greater force is applied to the first leg 142 of the first and fourth cams 132A, 132D than the biasing force provided by the elastic members 140, the first and fourth cams 132A, 132D are rotated counterclockwise into a position securing the crossbar 76 of the secondary frame 14 in place. When the cams 132A–132D are position to secure the crossbar 76 of the secondary frame 14 in the locking mechanism, the right side (as viewed in FIG. 9) of the first leg 142 of the first and fourth cams 132A, 132D is abuttingly braced by the protuberances 162 of the second and third cams 132B, 132C.

The shape of the second cam 132B and the shape of the first leg 142 of the first cam 132A, and the elastic member 140 combine to cause the first cam 132A to rotate in a counterclockwise direction (as shown by the arrow denoted "B" in FIG. 9). This causes the second leg 144 of the first cam 132A to also rotate in a counter-clockwise direction and causes the second leg 144 to secure the crossbar 76 of the secondary frame 14 within the groove 146 of the first cam 132A.

The operation of the third and fourth cams 132C, 132D is similar except for that the upper hook portion 134 of the third cam 132C allows the rod 100 of the connecting member 18 to be secured by a prong 148 when the rod 100 of the connecting member 118 is slid to the lower end of the channel 40 (as viewed in FIGS. 2 and 3). Once the rod 100 of the connecting member 18 is engaged with the prong 148 of the cam locking device 130, the rod 100 is secured in position until a cam axle 138 is rotated via the cam lock release handle 150. While a preferred cam locking device 130 has been described, those of skill in the art will appreciate from this disclosure that other mechanisms or different cam combinations can be used for the second locking mechanism 22 without departing from the scope of the present invention.

When the hand truck 10 is secured in the hand-truck-position, the crossbar 76 of the secondary frame 14 is secured in the cam locking device 130 by the second leg 144 of the first and fourth cams 132A, 132D of each cam locking device 130. Thus secured, the secondary frame 14 is securely held in the hand-truck-position until the cam lock release handle 150 is rotated in the clockwise direction (as viewed in FIG. 1).

Referring to FIGS. 2, 3 and 9, to move the secondary frame 14 from the hand-truck-position into the inclined-cart-position, the cam lock release handle 150 is rotated in the clockwise direction (as viewed in FIG. 2) causing the second and third cams 132B, 132C to rotate and drive the first and fourth cams 132A, 132D in the clockwise direction to cause the crossbar 76 to disengage from the cam-locking device 130. Once the crossbar 76 of the secondary frame 14 is released from the cam-locking device 130, the secondary frame 14 is rotated in a counterclockwise direction (as viewed in FIG. 1). By moving the secondary frame 14 almost perpendicular with the primary frame 12, the rod 100 of the connecting member 18 is caused to start sliding generally downwardly in the channel 40. Once the rod 100 has begun its downwardly motion in the channel 40, the secondary frame 14 is rotated in the clockwise direction (which further drives the rod 100 in the downward direction) until the bushings 112 of the rod 100 of the connecting member 18 are engaged with the upper hook portion 134 of the cam locking devices 130. The angled surface 152 of the upper hook portion 134 of the cam locking device 130 abuts the bushing 112 when the rod 100 of the connecting member 18 is driven downwards. The contact between the bushing 112 and the upper hook portion 134 of the third cam 132C causes the upper hook portion 134 to be rotated in the clockwise direction (as viewed in FIG. 9) until the bushings 112 have passed the prong 148 of the upper hook portion 134. After the bushings 112 have passed the prong 148 of the third cam 132C, the elastic members 140 cause the upper hook portion 134 to rotate counterclockwise to secure the bushing 112 in position. Thus secured, the hand truck 10 is locked in the inclined-cart-position via the first locking mechanism 20 and the second locking mechanism 22.

To adjust the hand truck 10 from the inclined-cart-position into the cart-position, the knobs 116 of the first locking device 20 are generally outwardly displaced from the collars 26 causing the plugs 118 to be removed from the holes 124 in the legs 62 of the secondary frame 14. Once the plugs 118 are disengaged from the secondary frame 14, the legs 62 are slid through the collars 26 toward the front side of the primary frame 12. Referring to FIG. 10, the lower end of each leg 62 of the secondary frame 14 has a catch 158 attached on an inwardly facing side of the leg 62. Referring to FIGS. 1 and 10, the catch 158 is engagable with one of the upper flanges 66 to secure the hand truck 10 in the cart-position.

The catch 158 is knob-shaped and has a circumferential groove 160 that allows a catch-receiving groove 154 in the corresponding upper flange 66 to engage the catch 158. Referring to FIG. 4, to engage the catch 158 with the catch receiving groove 154, the secondary frame 14 is positioned generally perpendicularly to the primary frame 12. Then, the secondary frame is slid leftwardly (as viewed in FIG. 4). At approximately the same time as the catch 158 is engaged by the catch receiving groove 154, the crossbar 76 of the secondary frame 14 (best shown in FIG. 3) engages a crossbar receiving groove 156 in each of the upper flanges 66. Thus, as the secondary frame 14 is slid through the collars 26 to bring the wheels 60 (located at the end of the legs 62) toward the primary frame 12, the crossbar 76 engages the crossbar securing groove 156 in the upper flange 66 and the catch 158 engages the catch receiving groove 154.

The size and spacing of the crossbar securing groove 156 and the catch securing groove 154 correspond to the relative positions of the catch 158 (one of which is preferably, but not necessarily, located on each leg 62) and the crossbar 76 of the secondary frame 14. Thus, the distance between the crossbar 76 and the catch 158 (due to the sideplates 94, which support the crossbar 76 at a spaced apart distance from the legs 62) corresponds to the distance between the crossbar receiving groove 156 and the catch receiving groove 154. Thus, when sliding the secondary frame 14 through the collars 26 (while the secondary frame 14 is positioned generally perpendicular to the primary frame 12), the catch on each of the legs 62 engages the appropriate catch securing groove 154 and, at approximately the same time, the crossbar 76 engages the crossbar securing groove 156. Referring to FIG. 5, once both the catches 158 and the crossbar 76 have engaged the upper flanges 66, the hand truck 10 will remain securely in the cart-position as long as the wheels 16, 60 are generally in contact with the ground.

Those of ordinary skill in the art will appreciate from this disclosure that additional holes (not shown) can be placed in the legs 62 of the secondary frame 14 proximate to the rotating mounts 74. These additional holes would allow the plugs 118 of the first locking device 20 to engage the secondary frame 14 while the secondary frame is in the cart-position. Thus, the hand truck 10 of the present invention is capable of using a dual positive locking system to secure the hand truck 10 in the cart-position. As explained below, the hand truck 10 of the present invention also preferably uses a dual positive locking system when in either the hand-tuck-position or in the inclined-cart-position. This provides a more stable structure than that of conventional hand trucks. The positive dual locking system of the present invention increases the stability of the hand truck 10 when used on rough or uneven surfaces and significantly increases the safety of a hand truck operator when operating the hand truck 10 on non ideal surfaces.

To convert the hand truck 10 from the cart-position (shown in FIG. 5) back to the inclined-cart-position (shown in FIGS. 2 and 3), the hand truck 10 is positioned so that the primary frame 12 is generally perpendicular to the ground. This places the hand truck 10 in a position similar to that shown in FIG. 4. Then, the secondary frame 14 is slid through the collars 26 (to the right as viewed in FIG. 4) to disengage the crossbar 76 and the catches 158 from the crossbar securing groove 156 and the catch receiving groove 154, respectively. Afterwards, the secondary frame 14 is slid through the collars 26 until the first locking mechanism 20 causes the plugs 118 to reengage the holes 124 in the secondary frame 14 to secure the hand truck 10 in the inclined-cart-position (shown in FIGS. 2 and 3). Thus positioned, the hand truck 10 is securely positioned via both the first and second locking mechanisms 20, 22 in the inclined-cart-position.

To move the hand truck 10 from the inclined-cart-position into the hand-truck position (shown in FIG. 1), the cam lock release handle 50 is rotated clockwise to disengage the prongs 148 of the upper hook portions 134 of the cam locking device 130 from the bushings 112 of the connecting member 18. Once the bushings 112 of the connecting member 18 are released from the cam locking device 130, the secondary frame 14 is rotated counterclockwise (as viewed in FIG. 1) to allow the second end 96B of the connecting member 18 to slide upwardly until the second end 96B approaches the upper end of the channel 40. After the second end 96B of the connecting member 18 is positioned proximate to the upper end of the channel 40, the secondary frame 14 is pivotally rotated clockwise about the shaft 64 of the first locking device 20 until the crossbar 76 engages the cam locking device 130 to secure the hand truck 10 in the hand-truck-position.

As is clear from the foregoing description, the efficient design of the preferred embodiment of the hand truck 10 of the present invention significantly increases the stability and safety of operation of the hand truck 10 of the present invention. The increase in stability and safety is due to structure used to convert the hand truck 10 into any one of a cart and an inclined cart and is due to the preferable use of a dual positive locking system. It will be appreciated by those skilled in the art that many changes and modifications may be made to the above-described embodiment without departing from the inventive concept thereof. It is understood, therefore, that the present invention is not limited to the particular embodiment disclosed, but is intended to include all modifications and changes which are within the scope and the spirit as defined by the appended claims. For example, it is within the scope of the invention to include a second set of holes (not shown) proximate to the rotating mounts 74 on the secondary frame 14 to allow the first locking device 20 to positively secure the secondary frame 14 in the cart-position.

I claim the following:

1. A convertible hand truck, comprising:

a primary frame having a first pair of wheels rotatably mounted thereon, said primary frame includes a channel;

a secondary frame pivotally attached to said primary frame and having at least one additional wheel rotatably mounted thereon, said secondary frame being movable into a hand-truck-position, generally parallel to said primary frame, a cart-position, generally perpendicular to said primary frame, and an inclined-cart-position, generally positioned at a predetermined angle with respect to said primary frame, said secondary frame, while in either one of said inclined-cart-position and said cart-position, causing said at least one additional wheel in combination with said first pair of wheels, to support said primary frame when said secondary frame is in one of said inclined-cart-position and said cart-position;

a connecting member attached to said secondary frame and slidably engaged with said channel;

a first locking mechanism attached to said primary frame and detachably securing said secondary frame to said primary frame while said secondary frame is in said hand-truck-position and while said secondary frame is in said inclined-cart-position; and a second locking mechanism attached to said primary frame and detachably securing said connecting member to said primary frame while said secondary frame is in said inclined-cart-position.

2. The hand truck of claim 1, wherein said second locking mechanism is moveable between a connecting-member-locked-position, in which said connecting member is secured in position along said primary frame, and a connecting-member-unlocked-position, in which said connecting member is not secured in position along the primary frame.

3. The hand truck of claim 1, wherein said second locking mechanism is engagable with said secondary frame when said secondary frame is in said hand-truck-position and said second locking mechanism is engagable with said connecting member when said secondary frame is in said inclined-cart-position.

4. The hand truck of claim 3, wherein said second locking mechanism comprises a cam locking device.

5. The hand truck of claim 3, wherein said primary frame includes at least one collar for slidably and pivotally engaging said secondary frame.

6. The hand truck of claim 5, wherein said first locking mechanism comprises a detent mechanism attached on said at least one collar and detachably engages a hole in the secondary frame to fix the position of the secondary frame within said at least one collar.

7. A convertible hand truck, comprising:

a primary frame having a first pair of wheels rotatably mounted thereon;

a secondary frame pivotally attached to said primary frame and having at least one additional wheel rotatably mounted thereon, said secondary frame being movable into a hand-truck-position, generally parallel to said primary frame, a cart-position, generally perpendicular to said primary frame, and an inclined-cart-position, generally positioned at a predetermined angle with respect to said primary frame, said secondary frame, while in either one of said inclined-cart-position and said cart-position, causing said at least one additional wheel in combination with said first pair of wheels, to support said primary frame when said secondary frame is in one of said inclined-cart-position and said cart-position;

a channel formed in said primary frame;

a connecting member attached to said secondary frame and slidably engaged with said channel;

a first locking mechanism attached to said primary frame and detachably securing said secondary frame to said primary frame while said secondary frame is in a position selected from any one of the group consisting of said hand-truck-position and said inclined-cart-position; and a second locking mechanism attached to said primary frame and detachably securing said connecting member to said primary frame while said secondary frame is in said inclined-cart-position.

8. The hand truck of claim 7, wherein said second locking mechanism is engagable with said secondary frame when said secondary frame is in said hand-truck-position and said second locking mechanism is engagable with said connecting member when said secondary frame is in said inclined-cart-position.

9. The hand truck of claim 7, wherein said second locking mechanism comprises a cam locking device.

10. The hand truck of claim 7, wherein said primary frame includes at least one collar slidably and pivotally engaging said secondary frame.

11. The hand truck of claim 10, wherein a first locking mechanism comprises a detent mechanism attached on said at least one collar and detachably engaging a hole in the secondary frame to fix the position of the secondary frame within said at least one collar.

* * * * *